United States Patent
Song et al.

(10) Patent No.: US 11,747,767 B2
(45) Date of Patent: Sep. 5, 2023

(54) METHOD AND APPARATUS FOR PROCESSING THREE-DIMENSIONAL HOLOGRAPHIC IMAGE

(71) Applicants: SAMSUNG ELECTRONICS CO., LTD., Suwon-si (KR); Korea University Research and Business Foundation, Sejong Campus, Sejong-si (KR)

(72) Inventors: Hoon Song, Yongin-si (KR); Hwi Kim, Sejong-si (KR); Jongha Park, Sejong-si (KR); Hojung Kim, Suwon-si (KR); Yongkyu Kim, Hwaseong-si (KR)

(73) Assignees: SAMSUNG ELECTRONICS CO., LTD., Suwon-si (KR); Korea University Research and Business Foundation, Sejong Campus, Sejong-si (KR)

( * ) Notice: Subject to any disclaimer, the term of this patent is extended or adjusted under 35 U.S.C. 154(b) by 553 days.

(21) Appl. No.: 16/780,402

(22) Filed: Feb. 3, 2020

(65) Prior Publication Data

US 2020/0301361 A1  Sep. 24, 2020

(30) Foreign Application Priority Data

Mar. 19, 2019 (KR) .................. 10-2019-0031465
Aug. 2, 2019 (KR) .................. 10-2019-0094536

(51) Int. Cl.
  *G03H 1/08* (2006.01)
  *G03H 1/00* (2006.01)

(52) U.S. Cl.
  CPC ... *G03H 1/0891* (2013.01); *G03H 2001/0088* (2013.01); *G03H 2001/0825* (2013.01); *G03H 2210/30* (2013.01)

(58) Field of Classification Search
  CPC ......... G03H 1/0891; G03H 2001/0088; G03H 2001/0825; G03H 2210/30; G03H 1/0808;
  (Continued)

(56) References Cited

U.S. PATENT DOCUMENTS 10,275,849 B2   4/2019  Kim et al.
2006/0139711 A1  6/2006  Leister et al.
(Continued)

FOREIGN PATENT DOCUMENTS

EP   3 296 886 A1   3/2018
JP   2010-169970 A  8/2010
(Continued)

OTHER PUBLICATIONS

Stephan Reichelt et al., "Computational hologram synthesis and representation on spatial light modulators for real-time 3D holographic imaging", Journal of Physics: Conference Series, 415, doi:10.1088/1742-6596/415/1/012038, 2013, pp. 1-10, 11 pages total.

(Continued)

*Primary Examiner* — Jade R Chwasz
(74) *Attorney, Agent, or Firm* — Sughrue Mion, PLLC

(57) ABSTRACT

A method for processing a three-dimensional holographic image includes obtaining depth images from depth data of a three-dimensional object, dividing each of the depth images into a predetermined number of sub-images, obtaining interference patterns of computer-generated hologram (CGH) patches corresponding to each of the sub-images by performing a Fourier transform to calculate an interference pattern in a CGH plane for object data included in each of
(Continued)

the sub-images, and generating a CGH for the three-dimensional object using the obtained interference patterns of the CGH patches.

24 Claims, 34 Drawing Sheets

(58) Field of Classification Search
CPC ....... G03H 2001/0204; G03H 2210/33; G03H 2210/454; G03H 1/02; G03H 1/26; G03H 1/08; G06F 17/142; G06T 3/005; G06T 7/50
USPC .................................................. 359/9, 32, 35
See application file for complete search history.

(56) References Cited

U.S. PATENT DOCUMENTS

| | | | |
|---|---|---|---|
| 2009/0213443 A1 | 8/2009 | Kang et al. | |
| 2010/0149611 A1 | 6/2010 | Leister | |
| 2014/0146373 A1* | 5/2014 | Wey | G03H 1/0808 359/9 |
| 2015/0161930 A1 | 6/2015 | Kim et al. | |
| 2016/0041524 A1 | 2/2016 | Song et al. | |
| 2018/0017938 A1* | 1/2018 | Kim | G09G 5/026 |
| 2018/0018829 A1* | 1/2018 | Kim | H04N 13/15 |

FOREIGN PATENT DOCUMENTS

| | | |
|---|---|---|
| KR | 10-0586026 B1 | 6/2006 |
| KR | 10-1366116 B1 | 2/2014 |
| KR | 10-2018-0024805 A | 3/2018 |

OTHER PUBLICATIONS

Ping Su et al., "Fast Computer-Generated Hologram Generation Method for Three-Dimensional Point Cloud Model", Journal of Display Technology, vol. 12, No. 12, Dec. 2016, pp. 1688-1694, 7 pages total.

Hwi Kim et al., "Accelerated synthesis of wide-viewing angle polygon computer-generated holograms using the interocular affine similarity of three-dimensional scenes", Optics Express, vol. 26, No. 13, Jun. 2018, pp. 16853-16874, 22 pages total.

Jinyoung Roh et al., "Full-color holographic projection display system featuring an achromatic Fourier filter", Optics Express, vol. 25, No. 13, Jun. 2017, pp. 14774-14782, 9 pages total.

Hak Gu Kim et al., "Acceleration of the calculation speed of computer-generated holograms using the sparsity of the holographic fringe pattern for a 3D object", Optics Express, vol. 24, No. 22, Oct. 2016, pp. 25317-25328, 12 pages total.

Hak Gu Kim et al., "Ultrafast layer based computer-generated hologram calculation with sparse template holographic fringe pattern for 3-D object", Optics Express, vol. 25, No. 24, Nov. 2017, pp. 30418-30427, 10 pages total.

Dajeong Im et al., "Accelerated synthesis algorithm of polygon computer-generated holograms", Optics Express, vol. 23, No. 3, DOI:10.1364/OE.23.002863, Feb. 9, 2015, pp. 2863-2871, 9 pages total.

Jia Jia et al., "Fast two-step layer-based method for computer generated hologram using sub-sparse 2D fast Fourier transform", Optics Express, vol. 26, No. 13, Jun. 2018, pp. 17487-17497, 11 pages total.

Communication dated Jul. 15, 2020 issued by the European Intellectual Property Office in counterpart European Application No. 20162706.4.

* cited by examiner

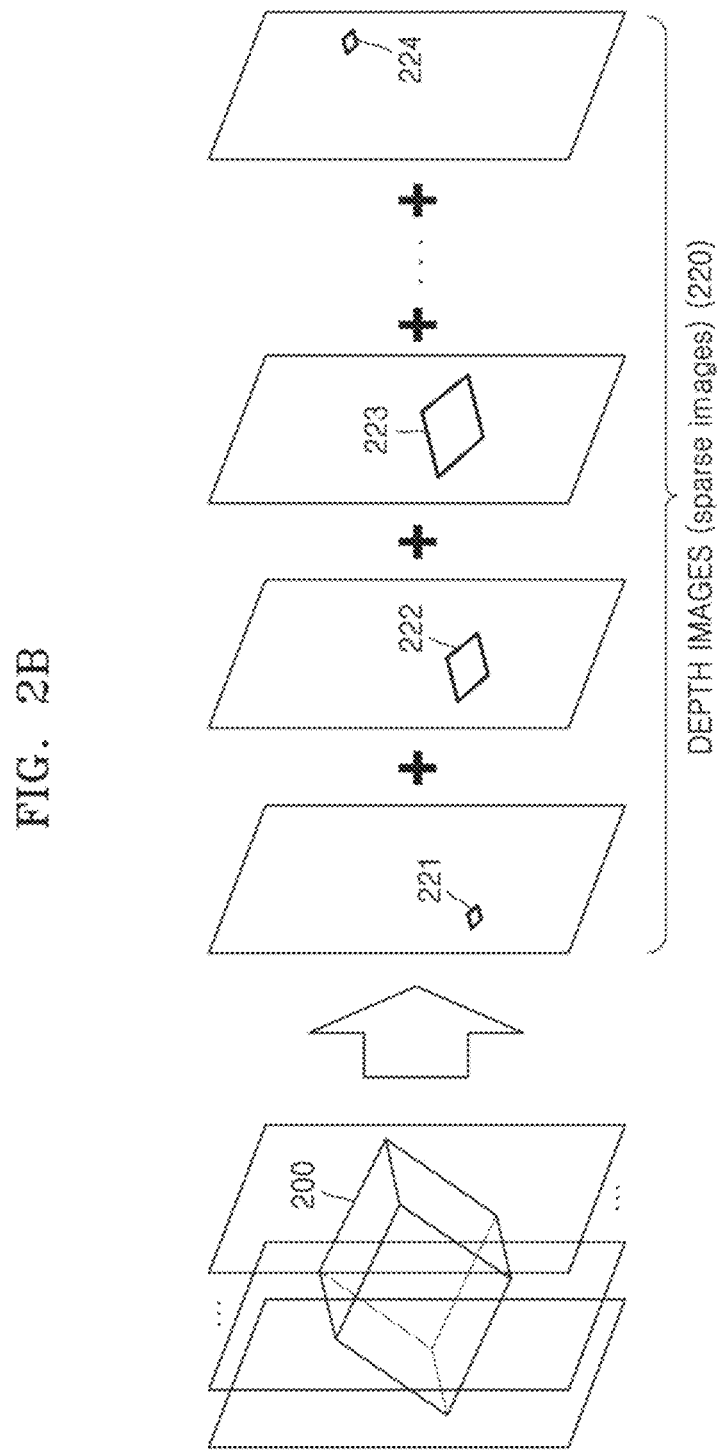

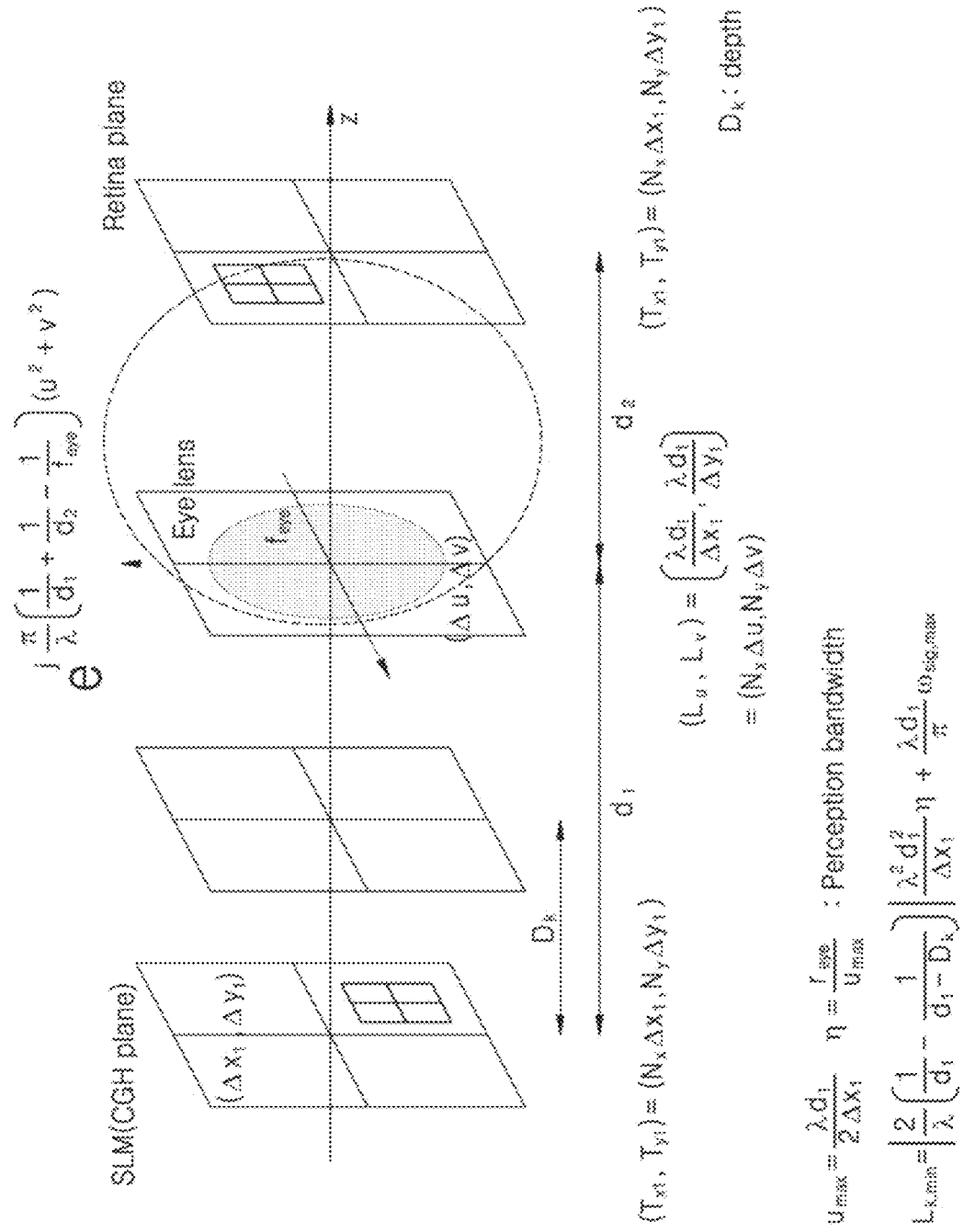

FIG. 10

| Percentage of Zero-padding(%) | Computation time(s) | Deviation(%) | Percentage of Zero-padding(%) | Computation time(s) | Deviation(%) |
|---|---|---|---|---|---|
| Global conv. | 270.0919 | 0 | 50 | 81.5997 | 3.4525 |
| 0 | 6.5338 | 21.8553 | 60 | 98.0180 | 3.4036 |
| 10 | 13.8639 | 12.3005 | 70 | 123.0491 | 3.4203 |
| 20 | 21.5161 | 6.0342 | 80 | 158.0961 | 3.4689 |
| 30 | 37.0516 | 4.2324 | 90 | 193.0951 | 3.5264 |
| 40 | 54.2376 | 3.6616 | 100 | 226.4386 | 3.5856 |

FIG. 14A

Sampling interval at the SLM plane
$(\Delta x_s, \Delta y_s)$

Sampling interval at the eyelens plane
$$(\Delta u_e, \Delta v_e) = \lambda F \left( \frac{1}{\Delta x_s N_x}, \frac{1}{\Delta y_s N_y} \right)$$

Sampling interval at the retina plane
$$(\Delta x_r, \Delta y_r) = \lambda d_{eye} \left( \frac{1}{\Delta u_e N_x}, \frac{1}{\Delta v_e N_y} \right) = \frac{d_{eye}}{F} (\Delta x_s, \Delta y_s)$$

Sampling interval at the depth plane
$$(\Delta u_k, \Delta v_k) = \frac{F - d_k}{D_{eye}} (\Delta x_r, \Delta y_r) = \frac{F - d_k}{F} (\Delta x_s, \Delta y_s)$$

Sampling interval at the SLM local patch
$M_L$ =patch size=local size+zero padding
$$(\Delta \bar{x}, \Delta \bar{y}) = \left( \frac{\lambda d_k}{\Delta u_k M_L}, \frac{\lambda d_k}{\Delta v_k M_L} \right) = \left( \frac{\lambda d_k F}{(F - d_k) \Delta x_s M_L}, \frac{\lambda d_k F}{(F - d_k) \Delta y_s M_L} \right)$$

<THRESHOLD DEPTH CONDITION> ---- 1350
$(\Delta x_s, \Delta y_s) \leq (\Delta \bar{x}, \Delta \bar{y})$
$\rightarrow \Delta x_s \leq \frac{\lambda d_k F}{(F - d_k) \Delta x_s M_L}$ & $\Delta y_s \leq \frac{\lambda d_k F}{(F - d_k) \Delta y_s M_L}$

METHOD AND APPARATUS FOR PROCESSING THREE-DIMENSIONAL HOLOGRAPHIC IMAGE

CROSS-REFERENCE TO RELATED APPLICATIONS

This application claims priority under 35 U.S.C. § 119 to Korean Patent Application Nos. 10-2019-0094536, filed on Aug. 2, 2019, and 10-2019-0031465, filed on Mar. 19, 2019, in the Korean Intellectual Property Office, the disclosures of which are incorporated by reference herein in their entireties.

BACKGROUND

1. Field

The disclosure relates to methods and apparatuses for processing a three-dimensional (3D) holographic image, and more particularly, to methods and apparatuses for processing computer-generated holograms (CGHs).

2. Description of Related Art

A hologram is a kind of 3D spatial representation that has no limitation of the field of view and little stereoscopic fatigue since an image of an object is reproduced in a 3D space by controlling an amplitude and phase of light. Accordingly, devices that realize high resolution holograms in real time have been developed by using a complex spatial light modulator (SLM) capable of simultaneously controlling the amplitude and phase of light. A hologram may be displayed in a 3D space by using an interference pattern formed when an object wave and a reference wave are incident upon the same position. Recently, a computer-generated hologram (CGH) technology has been utilized. The CGH technology may provide a hologram on a flat panel display by processing an interference pattern for reproducing a holographic video. A method of generating digital holograms, for example, a CGH technology, generates holograms by approximating optical signals and calculating interference patterns generated through mathematical operations. A method of generating a digital hologram includes representing a finished hologram by calculating data that constitute a 3D object based on the fact that the 3D object includes a collection of various data such as 3D points, polygons, or depth data.

SUMMARY

Provided are methods and apparatuses for processing a three dimensional (3D) holographic image. However, the technical goal of the disclosure is not limited thereto, and other technical goals may be inferred from the following embodiments.

Additional aspects will be set forth in part in the description which follows and, in part, will be apparent from the description, or may be learned by practice of embodiments of the disclosure.

In accordance with an aspect of the disclosure, a method of processing a three-dimensional holographic image includes obtaining a plurality of depth images for a predetermined number of depth layers from depth data of a three-dimensional object, each depth image from among the plurality of depth images having a predetermined resolution and corresponding to a respective depth layer from among the predetermined number of depth layers; dividing each depth image from among the plurality of depth images into a predetermined number of sub-images to be processed by respective processing units from among a plurality of processing units; obtaining a plurality of interference patterns of a plurality of computer-generated hologram (CGH) patches in a CGH plane, each CGH patch from among the plurality of CGH patches corresponding to at least one respective sub-image from among the predetermined number of sub-images, by performing a Fourier transform on object data included in the respective sub-image to calculate an interference pattern in the CGH plane corresponding to the respective sub-image; and generating a CGH of the three-dimensional object using the obtained plurality of interference patterns.

Each sub-image from among the predetermined number of sub-images may have an area of at least two pixels.

A respective position of each sub-image from among the predetermined number of sub-images in each depth image from among the plurality of depth images may correspond to a respective patch position of each CGH patch from among the plurality of CGH patches in the CGH plane, and a group of interference patterns calculated from a group of sub-images that correspond to a same patch position in each depth image from among the plurality of depth images may be mapped to a CGH patch from among the plurality of CGH patches located at the same patch position in the CGH plane.

The generating the CGH may include generating the CGH by merging the obtained plurality of interference patterns to obtain a global interference pattern in an entire area of the CGH plane.

The obtaining the plurality of interference patterns may include determining, with respect to each depth image from among the plurality of depth images, a sub-image from among the predetermined number of sub-images in which the object data is present, as a region of interest (ROI); and obtaining the plurality of interference patterns by performing the Fourier transform on the determined sub-image and refraining from performing the Fourier transform on remaining sub-images from among the predetermined number of sub-images.

The sub-image determined as the ROI may be determined based on a value of the object data present in the sub-image being greater than a predetermined threshold.

The obtaining the plurality of interference patterns may further include performing zero padding in a predetermined range on an edge of the sub-image determined as the ROI to form a zero-padded sub-image; and obtaining the plurality of interference patterns by performing the Fourier transform on the zero-padded sub-image.

The obtaining the plurality of interference patterns may further include refraining from performing the Fourier transform on a depth image from among the plurality of depth images that does not include the sub-image determined as the ROI.

The Fourier transform may include a double stage Fourier transform comprising a primary Fourier transform that calculates propagation of a light wave from a retina plane of an observer to an eye lens plane of the observer and a secondary Fourier transform that calculates propagation of the light wave from the eye lens plane to the CGH plane.

The Fourier transform may calculate propagation of a light wave from a depth layer from among the predetermined number of depth layers to the CGH plane.

The obtaining the plurality of interference patterns may include performing a convolution of a spherical wave on a sub-image from among the predetermined number of sub-images corresponding to an ROI; performing zero padding in a predetermined range on an edge of the sub-image corresponding to the ROI to form a zero-padded sub-image; obtaining an interference pattern by performing the Fourier transform on the zero-padded sub-image; and obtaining the plurality of interference patterns by performing interpolation to match the obtained interference pattern with a sampling grid of a spatial light modulator (SLM).

The Fourier transform may include a hybrid Fourier transform including a single stage Fourier transform on a first depth image from among the plurality of depth images of a first depth layer from among the predetermined number of depth layers having a first depth that is greater than a threshold depth; and a double stage Fourier transform on a second depth image from among the plurality of depth images of a second depth layer from among the predetermined number of depth layers having a second depth that is less than the threshold depth.

A non-transitory computer-readable recording medium may have recorded thereon a program for executing the method of the above-noted aspect of the disclosure.

In accordance with an aspect of the disclosure, an apparatus for processing a three-dimensional holographic image includes a memory in which at least one program is stored; and a processor configured to process the three-dimensional holographic image by executing the at least one program, wherein the processor is further configured to: obtain a plurality of depth images for a predetermined number of depth layers from depth data of a three-dimensional object, each depth image from among the plurality of depth images having a predetermined resolution and corresponding to a respective depth layer from among the predetermined number of depth layers, divide each depth image from among the plurality of depth images into a predetermined number of sub-images to be processed by respective processing units from among a plurality of processing units, obtain a plurality of interference patterns of a plurality of computer-generated hologram (CGH) patches in a CGH plane, each CGH patch from among the plurality of CGH patches corresponding to at least one respective sub-image from among the predetermined number of sub-images by performing a Fourier transform on object data included in the respective sub-image to calculate an interference pattern in the CGH plane corresponding to the respective sub-image, and generate a CGH of the three-dimensional object using the obtained plurality of interference patterns.

Each sub-image from among the predetermined number of sub-images may have an area of at least two pixels.

A respective position of each sub-image from among the predetermined number of sub-images in each depth image from among the plurality of depth images may correspond to a respective patch position of each CGH patch from among the plurality of CGH patches in the CGH plane, and a group of interference patterns calculated from a group of sub-images that correspond to a same patch position in each depth image from among the plurality of depth images may be mapped to a CGH patch from among the plurality of CGH patches located at the same patch position in the CGH plane.

The processor may be further configured to generate the CGH by merging the obtained plurality of interference patterns to obtain a global interference pattern in an entire area of the CGH plane.

The processor may be further configured to: determine, with respect to each depth image from among the plurality of depth images, a sub-image from among the predetermined number of sub-images in which the object data is present, as a region of interest (ROI), and obtain the plurality of interference patterns by performing the Fourier transform on the determined sub-image and refraining from performing the Fourier transform on remaining sub-images from among the predetermined number of sub-images.

The sub-image determined as the ROI may be determined based on a value of the object data present in the sub-image being greater than a predetermined threshold.

The processor may be further configured to: perform zero padding in a predetermined range on an edge of the sub-image determined as the ROI to form a zero-padded sub-image, and obtain the plurality of interference patterns by performing the Fourier transform on the zero-padded sub-image.

The processor may be further configured to refrain from performing the Fourier transform on a depth image from among the plurality of depth images that does not include the sub-image determined as the ROI.

The Fourier transform may include a double stage Fourier transform comprising a primary Fourier transform that calculates propagation of a light wave from a retina plane of an observer to an eye lens plane of the observer and a secondary Fourier transform that calculates propagation of the light wave from the eye lens plane to the CGH plane.

The Fourier transform may calculate propagation of a light wave from a depth layer from among the predetermined number of depth layers to the CGH plane.

The processor may be further configured to: perform a convolution of a spherical wave on a sub-image from among the predetermined number of sub-images corresponding to an ROI, perform zero padding in a predetermined range on an edge of the sub-image corresponding to the ROI to form a zero-padded sub-image, obtain an interference pattern by performing the Fourier transform on the zero-padded sub-image, and obtain the plurality of interference patterns by performing interpolation to match the obtained interference pattern with a sampling grid of a spatial light modulator (SLM).

The Fourier transform may include a hybrid Fourier transform comprising: a single stage Fourier transform on a first depth image from among the plurality of depth images of a first depth layer from among the predetermined number of depth layers having a first depth that is greater than a threshold depth; and a double stage Fourier transform on a second depth image from among the plurality of depth images of a second depth layer from among the predetermined number of depth layers having a second depth that is less than the threshold depth.

In accordance with an aspect of the disclosure, a processor for processing a three-dimensional holographic image includes a plurality of fast Fourier transform (FFT) cores configured to perform Fourier operations; and a main control unit (MCU) configured to schedule the Fourier operations of the plurality of FFT cores, wherein the MCU is further configured to: obtain a plurality of depth images for a predetermined number of depth layers from depth data of a three-dimensional object, each depth image from among the plurality of depth images having a predetermined resolution and corresponding to a respective depth layer from among the predetermined number of depth layers, divide each depth image from among the plurality of depth images into a predetermined number of sub-images, and schedule the Fourier operations of the plurality of FFT cores by allocating an FFT core from among the plurality of FFT cores to perform the Fourier operation on each sub-image from among the predetermined number of sub-images, wherein each FFT core from among the plurality of FFT cores is configured to perform a Fourier transform on object data included in the respective sub-image to calculate an interference pattern of a CGH patch in a CGH plane corresponding to the respective sub-image, and wherein the MCU is further configured to: obtain a plurality of interference patterns by obtaining the respective interference patterns corresponding to each sub-image from among the predetermined number of sub-images based on a result of the plurality of FFT cores performing the Fourier transform, and generate a CGH of the three-dimensional object using the obtained plurality of interference patterns of the CGH patches.

The MCU may be further configured to: determine, with respect to each depth image from among the plurality of depth images, a sub-image from among the predetermined number of sub-images in which object data is present, as a region of interest (ROI), and allocate to the plurality of FFT cores the respective sub-images determined as the ROI from among the predetermined number of sub-images.

In accordance with an aspect of the disclosure, a three-dimensional holographic image generation apparatus may include a memory in which at least one program is stored; and a processor configured to: receive object data regarding a three-dimensional object, the object data including depth data; divide the object data into a plurality of depth images according to the depth data such that each depth image from among the plurality of depth images has a different depth; for each depth image from among the plurality of depth images, divide the depth image into a plurality of sub-images; for each sub-image from among the plurality of sub-images, generate a respective interference pattern based on the object data corresponding to the sub-image; combine the generated interference patterns to form a global interference pattern; and generate a computer-generated hologram (CGH) of the three-dimensional object at a CGH plane based on the global interference pattern.

The processor may be further configured to perform a first Fourier transform on the object data corresponding to the sub-image based on a distance from the CGH plane to the depth image corresponding to the sub-image being greater than a predetermined distance.

The processor may be further configured to perform a second Fourier transform on the object data corresponding to the sub-image based on the distance from the CGH plane to the depth image corresponding to the sub-image being less than the predetermined distance.

The first Fourier transform may include a single stage Fourier transform.

The first Fourier transform may include a single stage Fourier transform and the second Fourier transform may include a double stage Fourier transform.

The processor may be further configured to: for each sub-image from among the plurality of sub-images, perform zero padding around the sub-image to form a respective zero-padded sub-image; and generate the respective interference pattern for each zero-padded sub-image.

The processor may be further configured to: for each sub-image from among the plurality of sub-images, perform convolution of a spherical wave on the sub-image to form a respective convoluted sub-image; for each convoluted sub-image from among the plurality of convoluted sub-images, perform zero padding around the sub-image to form a respective zero-padded sub-image; and generate the respective interference pattern for each zero-padded sub-image.

The predetermined distance may be determined based on a sampling interval of the CGH plane and a sampling interval of a CGH patch corresponding to the sub-image.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 2A and 2B are diagrams for describing two-dimensional (2D) images for each depth layer for a three-dimensional (3D) object, which are used when generating a CGH of the 3D object by using a depth map method, according to an embodiment;

FIGS. 8A and 8B are diagrams for describing zero padding of a sub-image, according to an embodiment;

FIG. 10 is a diagram for describing a simulation result for determining an appropriate range of zero padding, according to an embodiment;

FIGS. 14A and 14B are diagrams for describing a method of determining a threshold depth when performing a hybrid Fourier transform according to an embodiment;

DETAILED DESCRIPTION

With respect to the terms used in embodiments of the disclosure, general terms currently and widely used are selected in view of function with respect to the disclosure. However, the terms may vary according to an intention of a technician practicing in the pertinent art, an advent of new technology, etc. In specific cases, terms may be chosen arbitrarily, and in this case, definitions thereof will be described in the description of the corresponding disclosure. Accordingly, the terms used in the description should not necessarily be construed as simple names of the terms, but should be defined based on meanings of the terms and overall contents of the disclosure.

The terms, "include(s)" or "comprise(s)" should not be interpreted or understood as including, without exception, all of the plurality of elements or the plurality of steps disclosed in the description. In other words, it should be understood that some of the elements or some of the steps may not be included, or that additional elements or steps may be further included.

Embodiments will be described in detail below with reference to accompanying drawings. However, the disclosure may be implemented in various manners, and is not limited to one or more embodiments described herein.

Figure 1:
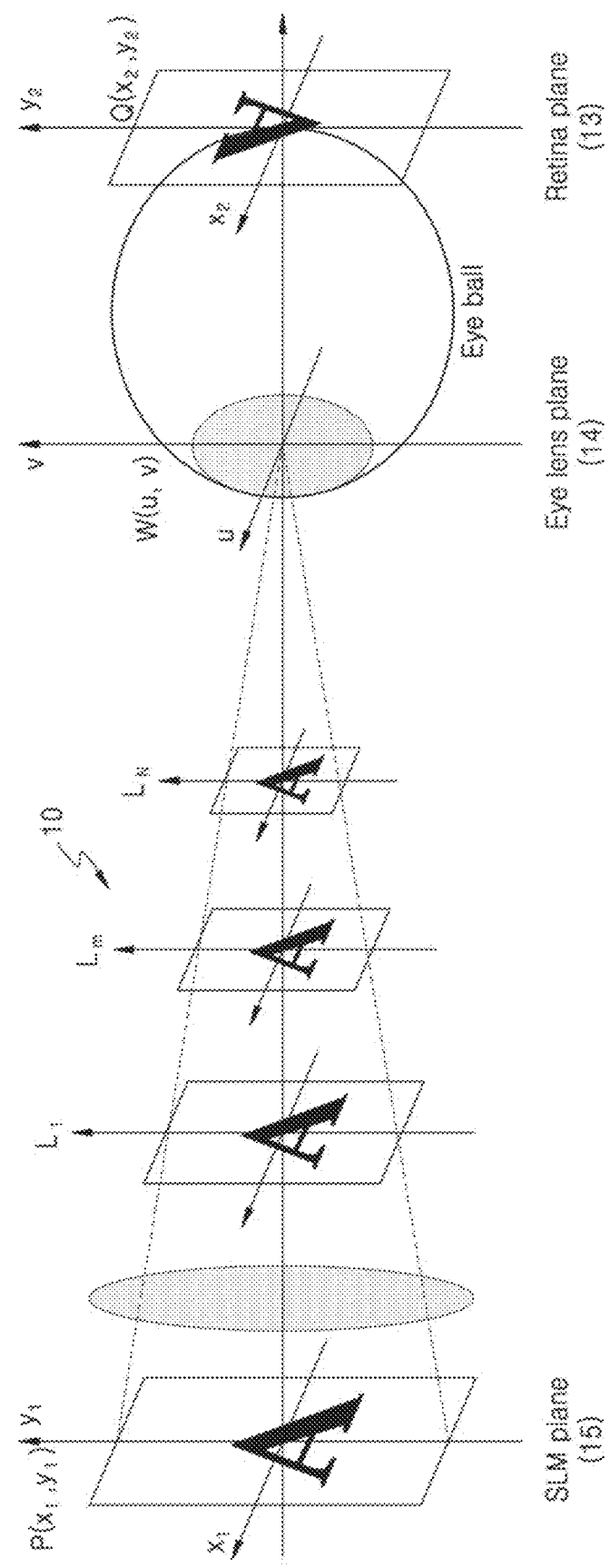
FIG. 1 is a diagram for describing a principle of processing a computer-generated hologram (CGH) according to an embodiment.

FIG. 1 is a diagram for describing a principle of processing a computer-generated hologram (CGH) according to an embodiment. Referring to FIG. 1, the principle of processing a CGH, which is 3D image content for a holographic display, will be briefly described as follows.

An observer may recognize an object in a space through an eye ball. The observer may see the object in the space as light reflected from the object is refracted through an eye lens on the front face of the eye ball and condensed on a retina on the back side of the eye ball. Using this principle, the principle of CGH processing may be implemented.

When the focus of the observer's eye lens plane W(u, v) 14 corresponds to a depth layer $L_1$, $L_M$ or $L_N$, it may be assumed that an image on the depth layer $L_1$, $L_M$ or $L_N$ has an imaging focus on (i.e., is focused on) a retina plane Q($x_2$, $y_2$) 13. Then, a complex light wave field in a spatial light modulator (SLM) plane (or referred to as 'CGH plane') P($x_1$, $y_1$) 15 may be calculated by inversely propagating an image formed on the retina plane 13 to the SLM plane (or CGH plane) 15, and thus, a CGH interference pattern for expressing a CGH may be obtained.

The CGH may be classified into a point cloud method, a polygon method, or a depth map (or layer-based) method according to a generation method. In the point cloud method, a surface of an object is expressed with a number of points and an interference pattern at each point is calculated, and thus, a precise depth may be expressed, but the amount of computation greatly increases depending on the number of points. In the polygon method, a surface of an object is expressed as polygon meshes and an interference pattern at each polygon mesh is calculated, and thus, the amount of computation is small even though the precision of the object is reduced. The depth map method is a layer-based method and a method of generating a CGH using a 2D intensity image and depth data, and the amount of computation may be determined according to the resolution of an image.

Because the depth map method is a method of calculating a CGH after approximating a 3D object to multi-depth and modeling, the efficiency of CGH calculation may be higher than that of other methods. Also, a CGH may be generated by using only 2D intensity information and depth information such as a general picture.

When a CGH is generated according to the depth map method, most of the CGH processing is occupied by Fourier transform operations. Fourier transform in CGH processing is an operation for obtaining a distribution of diffracted images obtained by Fresnel diffraction of an image and corresponds to generalized Fresnel transform (GFT) or Fresnel transform. In embodiments, the Fourier transform may include an inverse Fourier transform, a fast Fourier transform (FFT), a GFT, a Fresnel transform, and the like, which are operations using the Fourier transform. In FFT operations, the amount of computation may exponentially increase as image resolution increases, and thus, the particular acceleration algorithm used for CGH processing is important.

According to embodiments, in order to generate a CGH by using a depth map method, a method of dividing an area of an input image and a method of an accelerated processing algorithm capable of performing an efficient FFT operation on the divided areas (i.e., patches) may be used.

Figure 2A:
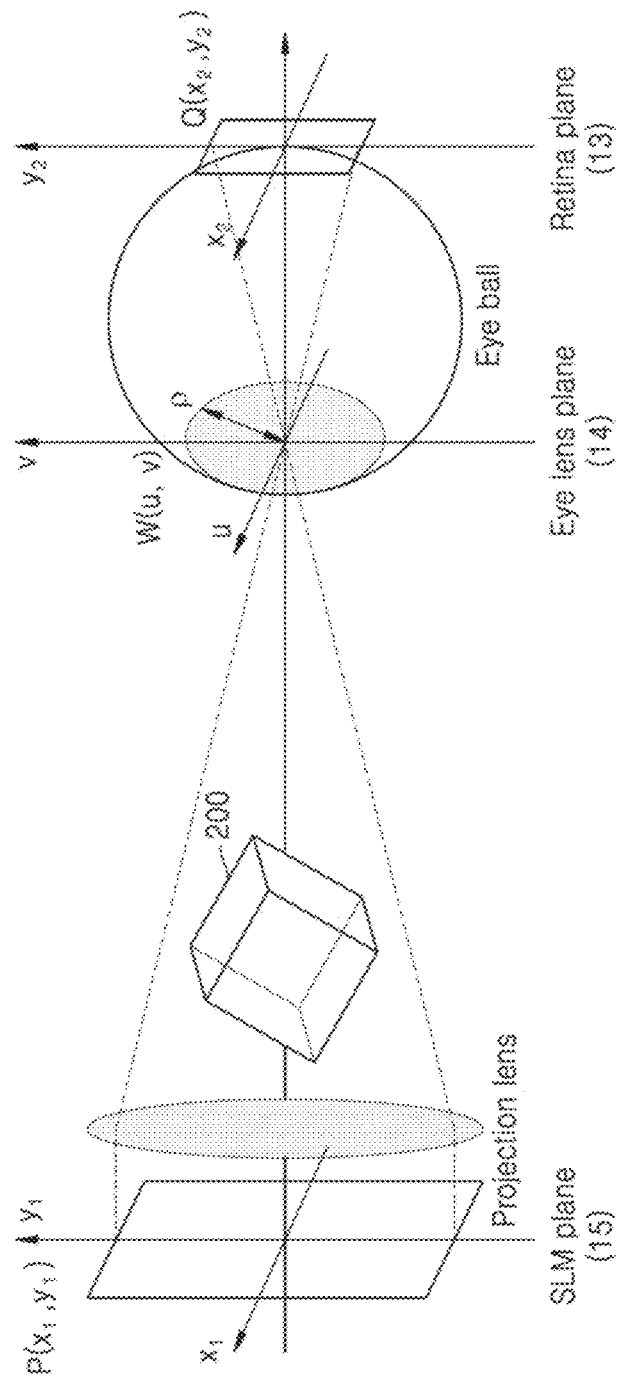

FIGS. 2A and 2B are diagrams for describing 2D images for each depth layer for a 3D object, which are used when generating a CGH of the 3D object by using a depth map method, according to an embodiment.

Referring to FIG. 2A, a 3D object 200 is located in a space between an eye lens plane 14 and an SLM plane (or CGH plane) 15. Hereinafter, the SLM plane 15 will be referred to as the CGH plane. According to the depth map method, the space may be set to be divided into a predetermined number of depth layers. In this case, the number of depth layers may be changed by a user setting. For example, the number of depth layers may be 256 or another number.

Referring to FIG. 2B, the 3D object 200 may be modeled as depth images 220 corresponding to a predetermined number of depth layers. The depth images 220 shown in FIG. 2B respectively include object data 221 to 224 of the 3D object 200 at a corresponding depth.

In a depth image of each depth layer, most areas may have a depth value of 0 and areas having a nonzero depth value in which object data is present may occupy a relatively small range. Due to sparsity of the depth image, it may be inefficient to perform Fourier transform on the entire area of the depth image. Thus, it may be desirable to increase the computational efficiency of CGH processing in consideration of image sparsity. An area where object data is present and an area where the object data is not present may be determined based on the depth value of 0 as described above, but the disclosure is not limited thereto, and a reference depth value may be a relatively small random value other than 0.

Figure 3:
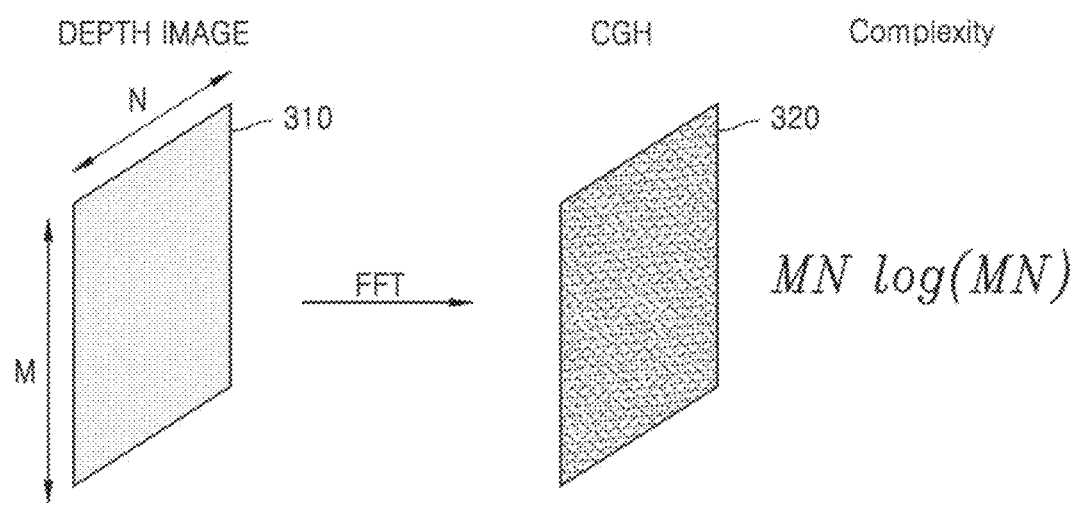
FIG. 3 is a diagram for describing computational complexity of CGH processing according to an embodiment.

FIG. 3 is a diagram for describing computational complexity of CGH processing according to an embodiment.

Referring to FIG. 3, a depth image 310 may be assumed to have M×N resolution with a pixel array of M pixels and N pixels (where M and N are natural numbers). A CGH 320 is generated by performing various types of CGH processing, such as Fourier transform, on the depth image 310. In this case, the computational complexity of the CGH processing may be calculated as in Expression 1, and the computational complexity of Expression 1 corresponds to a relative value.

$$MN \log(MN) \quad \text{[Expression 1]}$$

That is, the computational complexity of the CGH processing may be determined depending on the resolution (i.e., M×N) of the depth image 310. Thus, as image resolution increases, the computational complexity may increase relatively.

Figure 4:
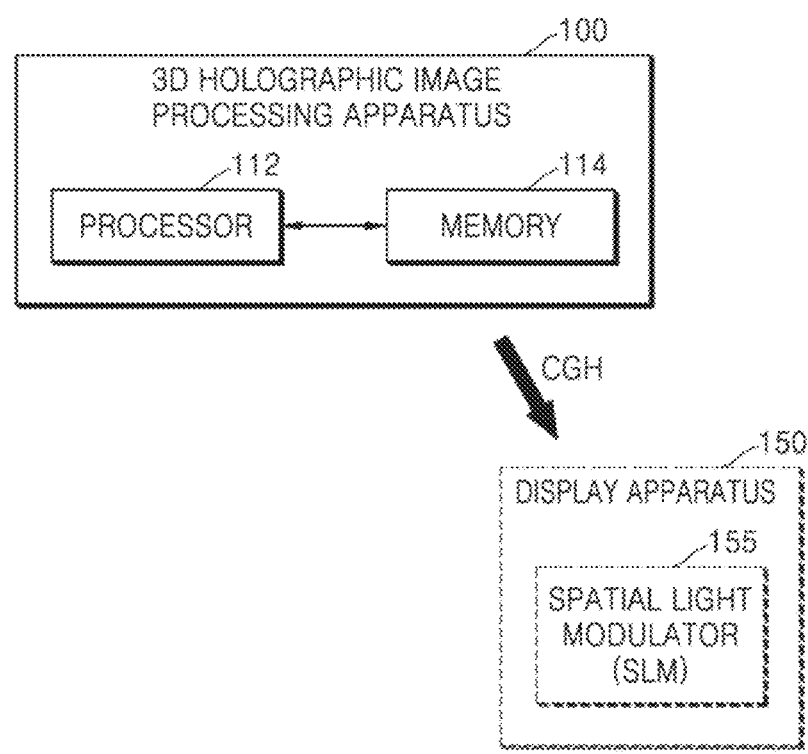
FIG. 4 is a block diagram of a hardware configuration of a 3D holographic image processing apparatus according to an embodiment.

FIG. 4 is a block diagram of a hardware configuration of a 3D holographic image processing apparatus 100 according to an embodiment.

Referring to FIG. 4, the 3D holographic image processing apparatus 100 includes a processor 112 and a memory 114. In the 3D holographic image processing apparatus 100 shown in FIG. 4, only components related to embodiments are illustrated. Thus, the 3D holographic image processing apparatus 100 may further include other components in addition to the components shown in FIG. 4.

The processor 112 may correspond to a processor provided in various types of computing devices such as a personal computer (PC), a server device, a television, a mobile device (smartphone, a tablet device, etc.), an embedded device, an autonomous vehicle, a wearable device, an augmented reality (AR) device, and an Internet of things (IoT) device. For example, the processor 112 may correspond to a processor such as a central processing unit (CPU), a graphics processing unit (GPU), an application processor (AP), or a neural processing unit (NPU), but is not limited thereto.

The processor 112 performs overall functions for controlling the 3D holographic image processing apparatus 100 equipped with the processor 112. The processor 112 may control the 3D holographic image processing apparatus 100 by executing programs stored in the memory 114. For example, when the 3D holographic image processing apparatus 100 is provided in a display apparatus 150, the processor 112 may control image processing by the 3D holographic image processing apparatus 100 to thereby control the display of a holographic image by the display apparatus 150.

The display apparatus 150 may correspond to a device capable of displaying a holographic image in a 3D space based on a CGH generated by the 3D holographic image processing apparatus 100. The display apparatus 150 may include a hardware module for hologram reproduction, for example, a spatial light modulator (SLM) 155, and may include various types of display panels such as LCD and OLED. That is, the display apparatus 150 may include various hardware modules and hardware configurations for displaying the holographic image, in addition to the 3D holographic image processing apparatus 100 for generating the CGH. The 3D holographic image processing apparatus 100 may be a separate independent apparatus implemented outside the display apparatus 150. In this case, the display apparatus 150 may receive CGH data generated by the 3D holographic image processing apparatus 100 and display a holographic image based on the received CGH data. However, the disclosure is not limited thereto and the 3D holographic image processing apparatus 100 may be integrated with the display apparatus 150. That is, the implementation manner of the 3D holographic image processing apparatus 100 and the display apparatus 150 is not limited by any one embodiment.

The memory 114 is hardware that stores various pieces of data processed in the processor 112. For example, the memory 114 may store CGH data processed in the processor 112 and CGH data to be processed. The memory 114 may also store various applications to be driven by the processor 112, for example, hologram playback applications, web browsing applications, game applications, and/or video applications.

The memory 114 may include at least one of volatile memory or nonvolatile memory. The nonvolatile memory includes read only memory (ROM), programmable ROM (PROM), electrically programmable ROM (EPROM), electrically erasable and programmable ROM (EEPROM), flash memory, phase-change random access memory (PRAM), magnetic RAM (MRAM), resistive RAM (RRAM), ferroelectric RAM (FRAM) or the like. The volatile memory includes dynamic RAM (DRAM), static RAM (SRAM), synchronous DRAM (SDRAM), phase-change RAM (PRAM), magnetic RAM (MRAM), resistive RAM (RRAM), ferroelectric RAM (FRAM), or the like. In an embodiment, the memory 114 may include at least one of a hard disk drive (HDD), a solid state drive (SSD), a compact flash (CF), a secure digital (SD), a micro-SD, a mini-SD, an extreme digital (xD), or a memory stick.

The processor 112 reads 2D intensity images and depth data of a 3D object from which a holographic image is to be generated. The processor 112 obtains a plurality of depth images of a predetermined resolution for a predetermined number of depth layers from the depth data of the 3D object. The predetermined resolution may be variously changed according to a user setting or an input image format. In embodiments, it is assumed that the predetermined resolution is M×N pixels.

The processor 112 divides each of the depth images into a predetermined number of sub-images corresponding to a processing unit for generating interference patterns of CGH patches (or referred to as 'SLM patches') in a CGH plane. The predetermined number may be determined and changed by various factors such as user setting, resolution of the depth image, and performance of the 3D holographic image processing apparatus 100.

The size of one sub-image is greater than the size of one pixel of the resolution of the depth image. That is, the sub-image corresponds to an image of an area where some pixels (i.e., more than one pixel) are grouped in the depth image. For example, the processor 112 may divide the depth image into m×n sub-images by dividing the entire area of the depth image with M×N resolution into m×n patches (where m and n are natural numbers). The sizes of each of the sub-images may be equal to or different from each other.

The interference patterns of the CGH patches correspond to partial CGH interference patterns corresponding to the position of each local area in the CGH plane, and may also be referred to as other terms such as an SLM patch, a local CGH pattern, a local SLM pattern, a sub-CGH, or a sub SLM. The CGH plane may be similarly divided into patches of a sampling grid for dividing the depth image into sub-images. That is, the CGH plane may be divided into, for example, m×n sub-CGH areas, similarly to the depth image, and each of the interference patterns of the CGH patches may be an interference pattern corresponding to the position of each of the sub-CGH areas on the CGH plane.

The processor 112 performs a fast Fourier transform FFT for calculating an interference pattern in the CGH plane for object data included in each of the sub-images in individual units having a size of the sub-image, thereby obtaining the interference patterns of the CGH patches corresponding to each of the sub-images.

As described above, the position of each of the sub-images in the depth images corresponds to the position of each of the interference patterns of the CGH patches in the CGH plane. Thus, the interference patterns calculated from different sub-images in different depth layers that are at the same patch location may be mapped to CGH patches (or SLM patches) at the same patch location in the CGH plane.

The processor 112 generates the entire CGH for the 3D object by using the obtained interference patterns of the CGH patches. That is, the processor 112 generates the CGH by merging the interference patterns of the obtained CGH patches to obtain an interference pattern (i.e., a global interference pattern) of a global CGH in the entire area of the CGH plane.

Figure 5:
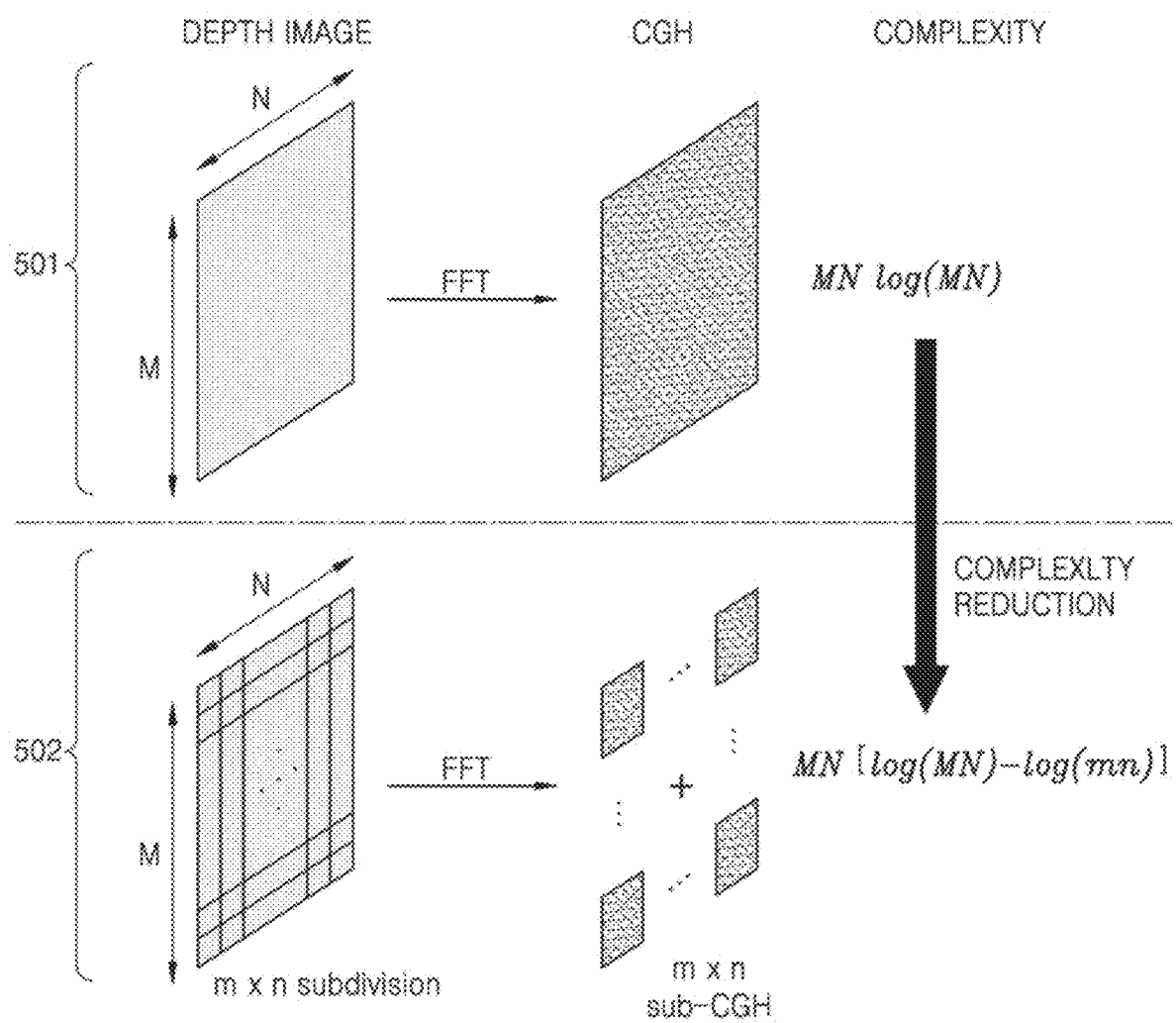
FIG. 5 is a diagram for describing that computational complexity is reduced by depth image subdivision, according to an embodiment.

That is, the 3D holographic image processing apparatus 100 performs CGH processing (e.g., FFT) by dividing each depth image into sub-images. This is because, as shown in FIG. 5, the computational complexity may be reduced as the depth image is divided into sub-images. Furthermore, the 3D holographic image processing apparatus 100 may set a region of interest (ROI) within the sub-images or perform a single stage Fourier transform on the sub-images, in order to perform more efficient CGH processing with the divided sub-images. This will be described in more detail with reference to the accompanying drawings.

FIG. 5 is a diagram for describing that computational complexity is reduced by depth image subdivision, according to an embodiment.

Referring to FIG. 5, computational complexity in a case 501 where a depth image is not divided into sub-images and computational complexity in a case 502 where a depth image is divided into sub-images are illustrated. In the case 501 where a depth image of M×N resolution is not divided, the computational complexity for generating CGH processing (operation such as FFT) is as described in Expression 1 above.

However, in the case 502 where a depth image of M×N resolution is divided into m×n sub-images and CGH processing is performed on the m×n sub-images to generate m×n CGH patches (sub-CGHs), the computational complexity may be reduced as in Expression 2 below.

$$MN[\log(MN) - \log(mn)] \qquad \text{[Expression 2]}$$

In other words, due to m×n subdivision, the computational complexity of CGH processing may be relatively reduced compared to the case of non-subdivision.

Figure 6:
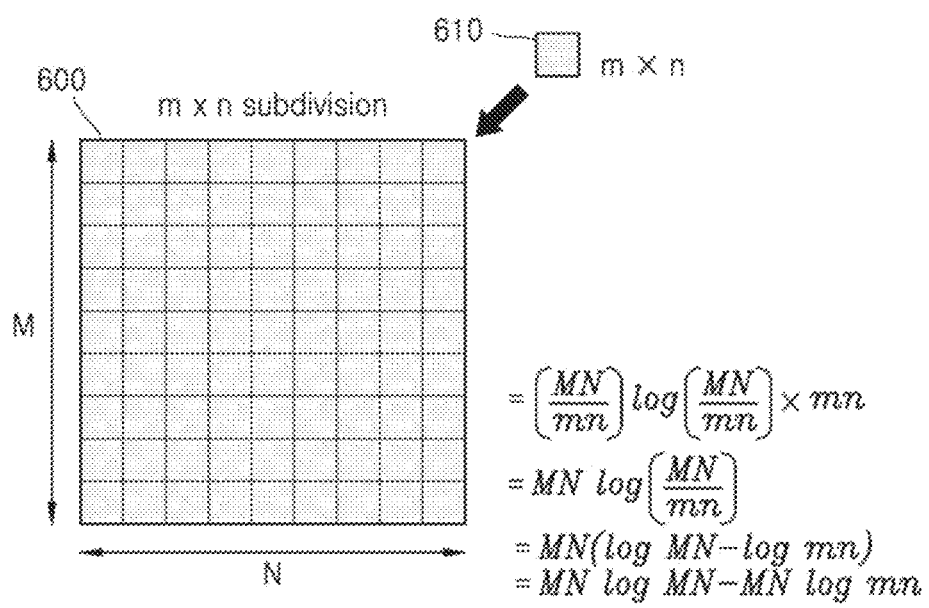
FIG. 6 is a diagram for describing a computational complexity of CGH processing reduced by m×n subdivision of a depth image, according to an embodiment.

FIG. 6 is a diagram for describing computational complexity of CGH processing reduced by m×n subdivision of a depth image, according to an embodiment.

Referring to FIG. 6, it is assumed that a depth image 600 having an M×N resolution is divided into m×n CGH patches 610. The computational complexity of CGH processing for the depth image 600 having the M×N resolution is as described in Expression 1 above. In contrast, a computational complexity calculation process considering the m×n subdivision will be described with reference to Expression 3 below.

$$\left(\frac{MN}{mn}\right)\log\left(\frac{MN}{mn}\right) \times mn = MN\log\left(\frac{MN}{mn}\right) = \qquad \text{[Expression 3]}$$

$$MN(\log(MN) - \log(mn)) = MN\log(MN) - MN\log(mn)$$

According to Expression 3, when Fourier transform is performed by localizing a calculation range of the M×N resolution into m×n CGH patches, the computational complexity of one CGH patch may be expressed as $$\left(\frac{MN}{mn}\right)\log\left(\frac{MN}{mn}\right)$$

because the resolution of one patch is $$\frac{M}{m} \times \frac{N}{n}.$$

When the computational complexity of the one CGH patch is multiplied by the total number (m×n) of patches in order to obtain the computational complexity for the total CGH patches, the computational complexity for the total CGH patches is MN log(MN)−MN log(mn). Thus, by dividing the depth image 600 into m×n CGH patches 610 (i.e., sub-images), the computational complexity of CGH processing (operation such as FFT) may be reduced by MN log(mn). Thus, as the resolution M×N of the depth image increases and/or the number (m×n) of CGH patches increase, the computational complexity may be further reduced.

Figure 7A:
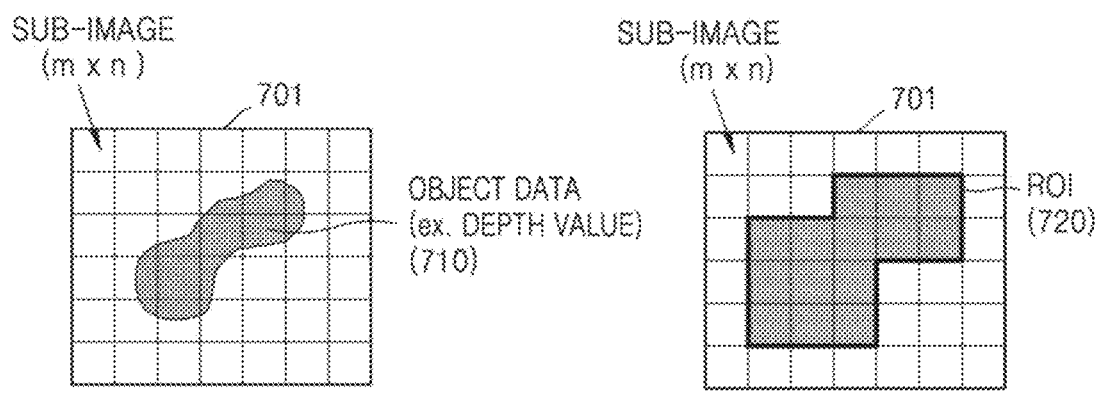
FIG. 7A is a diagram for describing setting a region of interest (ROI) among sub-images according to an embodiment.

FIG. 7A is a diagram for describing setting an ROI among sub-images according to an embodiment.

Referring to FIG. 7A, among m×n sub-images 701 of a depth image, there may be a sub-image in which the object data 710 is present and a sub-image in which the object data 710 is not present. In this case, the object data 710 may denote a depth value of a 3D object in a depth layer corresponding thereto. For example, the depth value may be expressed as a pixel value. The sub-image in which the object data 710 is present and the sub-image in which the object data 710 is not present may be determined based on a depth value 0 as described above. However, the disclosure is not limited thereto and a reference depth value may be any value that is relatively small other than 0.

The processor 112 of FIG. 4 determines, with respect to each of the depth images, a sub-image in which the object data 710 is present among the m×n sub-images 701, as an ROI 720. That is, the processor 112 may determine, as the ROI 720, a sub-image having a value of the object data 710, which is greater than a predetermined threshold value (e.g., 0), among the m×n sub-images 701. In the example of FIG. 7A, fourteen sub-images of CGH patch positions overlapping the object data 710 among the m×n sub-images 701 may be set to the ROI 720.

The processor 112 performs Fourier transform on the sub-images determined as the ROI 720. However, the processor 112 skips Fourier transform for the remaining sub-images not determined as the ROI 720. This is because it is not necessary to perform Fourier transform since there is no object data in the remaining sub-images that are not determined as the ROI 720 (that is, since the depth value or the pixel value is 0). As a result, since the processor 112 needs to perform Fourier transform only on sub-images of the ROI 720, the amount of computation may be reduced. The processor 112 obtains an interference pattern of a CGH patch corresponding to an ROI sub-image based on the result of Fourier transform on a sub-image determined as the ROI 720.

The processor 112 may skip a Fourier transform on an entire depth image that does not include any sub-image corresponding to the ROI 720.

Figure 7B:
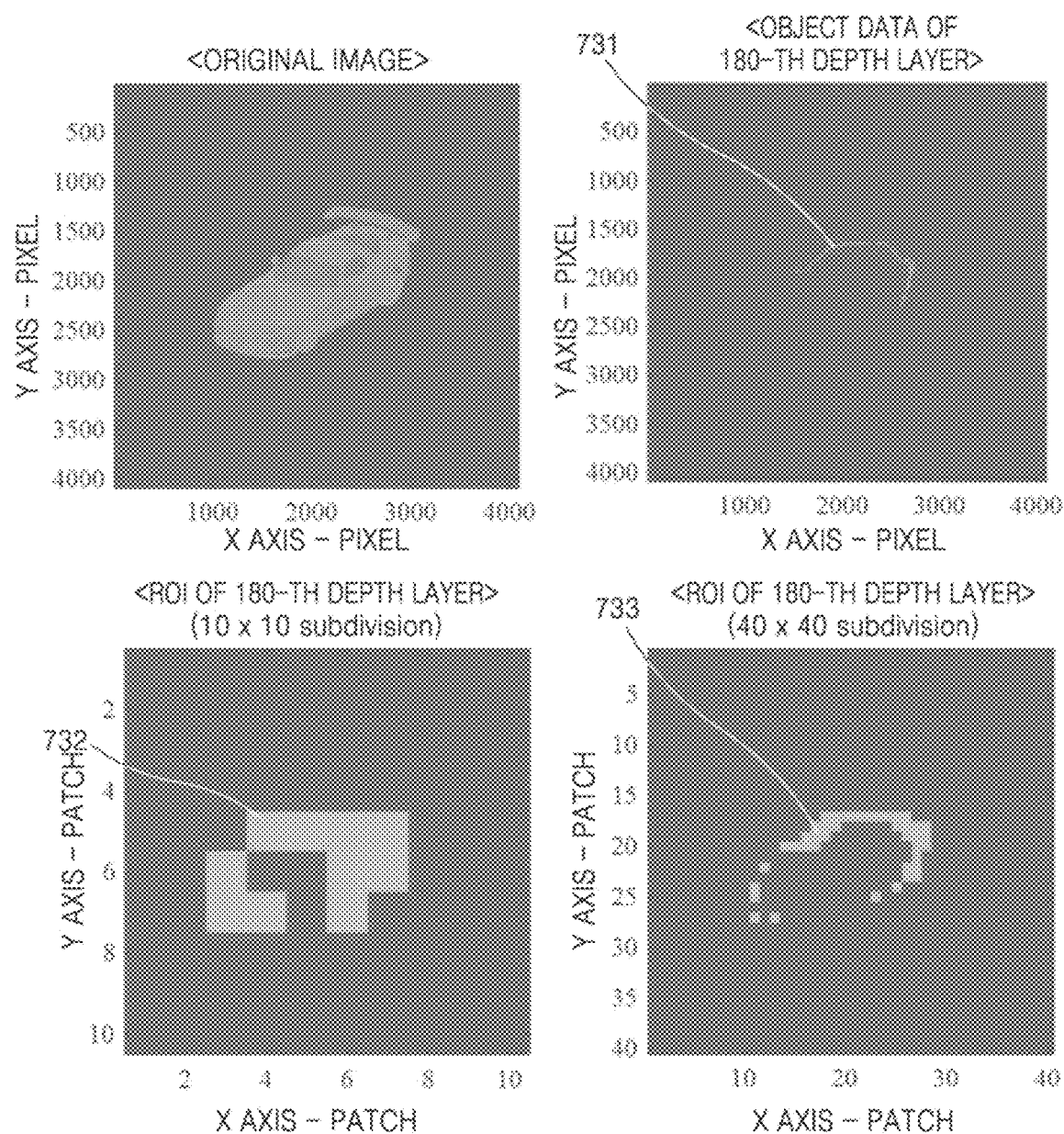
FIG. 7B is a diagram for describing that the number and positions of sub-images determined as the ROI may vary according to the number (m×n) of CGH patches for dividing a depth image, according to an embodiment.

FIG. 7B is a diagram for describing that the number and positions of sub-images determined as ROI may vary according to the number (m×n) of CGH patches for dividing a depth image, according to an embodiment.

Referring to FIG. 7B, an original image having about 4000×4000 resolution is divided into 256 depth layers, and object data 731 included in a depth image of a 180th depth layer among the 256 depth layers is shown. The number of pixels occupied by the object data 731 at the full resolution of the depth image is quite small.

An ROI 732 when the depth image is divided into, for example, 10×10 patches and an ROI 733 when the depth image is divided into, for example, 40×40 CGH patches are shown in FIG. 7B. Since the processor 112 in FIG. 4 needs to perform Fourier transform only on sub-images corresponding to the ROI 732 or 733 in each case, the amount of computation may be reduced relatively more than when Fourier transform is performed on the entire depth image. As the number of CGH patches increases, the range of the entire ROI may decrease, but the number of individual sub-images included in the ROI may increase. Conversely, as the number of CGH patches decreases, the range of the entire ROI may increase, but the number of individual sub-images included in the ROI may decrease. That is, the amount of computation of the processor 112 may be adjusted according to the number of CGH patches.

Figure 7C:
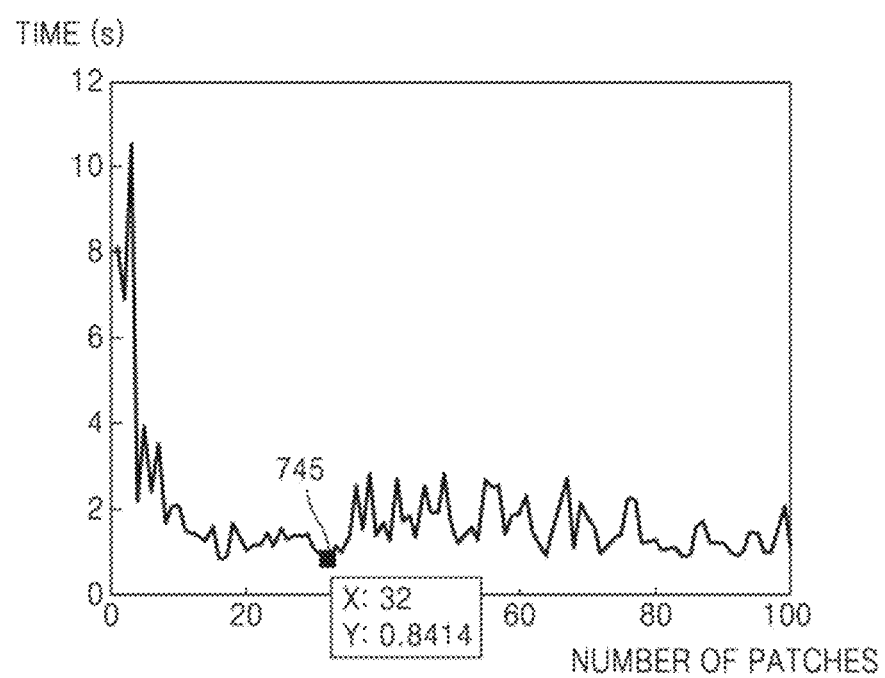
FIG. 7C is a diagram for describing a simulation result for determining an optimized number of patches, according to an embodiment.

FIG. 7C is a diagram for describing a simulation result for determining an optimized number of patches, according to an embodiment.

Referring to FIG. 7C, the result of measuring an FFT calculation time while increasing the number of CGH patches under a given set of conditions 740 is shown. Under the conditions shown in FIG. 7C, when a depth image is divided into 32×32 CGH patches, the calculation speed is the fastest. Theoretically, as the number of CGH patches increases, the calculation speed increases, but a computational load due to iterative calculation is also generated with an increase in the number of CGH patches. Thus, taking into account various factors affecting the calculation speed, an appropriate optimal number of CGH patches may be determined. FIG. 7C is only a result of a simulation under the given conditions 740, and the disclosure is not limited thereto and the number of CGH patches optimized for use conditions may be appropriately determined.

Figure 7D:
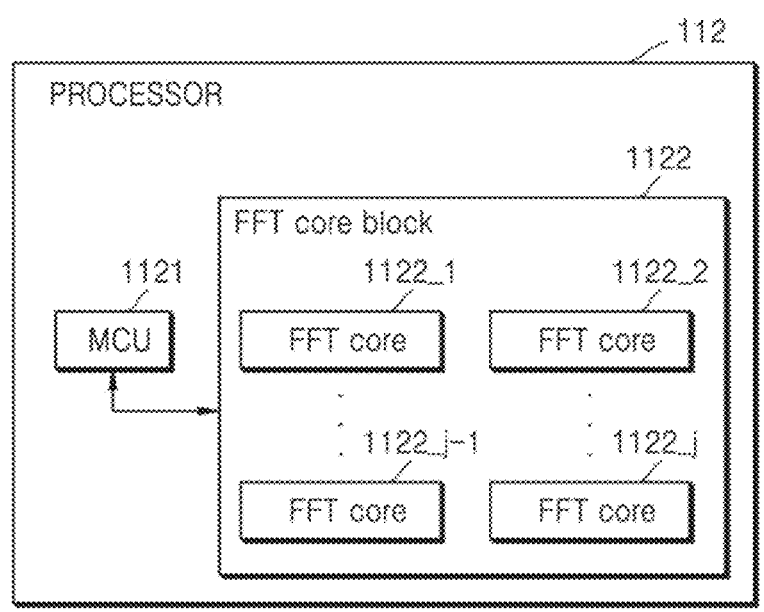
FIG. 7D is a block diagram of a detailed hardware configuration of a processor according to an embodiment.

FIG. 7D is a block diagram of a detailed hardware configuration of a processor 112 according to an embodiment.

The processor 112 in FIG. 7D corresponds to the processor 112 shown in FIG. 4, and as shown in FIG. 7D, the processor 112 may include a main control unit MCU 1121 and a plurality of FFT cores 1122_1, 1122_2, ..., 1122_j−1, and 1122_j (where j is a natural number). However, the detailed hardware configuration of the processor 112 shown in FIG. 7D is one example, and the processor 112 may further include other hardware configurations, or may be implemented as having different hardware configurations from that shown in FIG. 7D. That is, the detailed hardware configuration of the processor 112 is not limited to that shown in FIG. 7D.

The MCU 1121 corresponds to a control unit that generally controls the CGH processing operations of the processor 112. Specifically, the MCU 1121 may obtain a plurality of depth images of a predetermined resolution (e.g., M×N) for a predetermined number of depth layers from depth data of a 3D object, and may divide a given depth image of M×N resolution into a predetermined number (e.g., m×n) of sub-images (i.e., CGH patches). In addition, the MCU 1121 may determine, as an ROI, one or more sub-images in which object data is present, among the sub-images, and may schedule the operations of the plurality of FFT cores 1122_1, 1122_2, ..., 1122_j−1, and 1122_j by allocating an FFT core to perform a Fourier operation on each of the sub-images such that an efficient FFT operation is performed on the ROI in divided sub-images (i.e., CGH patches). That is, the MCU 1121 of the processor 112 has a function of controlling the CGH processing operations described above and CGH processing operations to be described below.

The plurality of FFT cores 1122_1, 1122_2, ..., 1122_j−1, and 1122_j respectively correspond to processing cores that perform Fourier operations (e.g., FFT operations). Fourier operations, such as FFT operations, correspond to operations that account for a large portion of the CGH processing operations, and the processor 112 may accelerate CGH processing through parallel processing of the plurality of FFT cores 1122_1, 1122_2, ..., 1122_j−1, and 1122_j. The plurality of FFT cores 1122_1, 1122_2, ..., 1122_j−1, and 1122_j may be distinguished from the MCU 1121 as an FFT core block 1122 within the processor 112. Each of the plurality of FFT cores 1122_1, 1122_2, ..., 1122_j−1, and 1122_j performs Fourier transform to calculate an interference pattern in a CGH plane for object data included in each of the sub-images in allocated sub-image units. In other words, each FFT core may perform Fourier transform on object data included in a single sub-image at a given time. Subsequently, the MCU 1121 obtains interference patterns of CGH patches corresponding to each of the sub-images based on the result of performing the Fourier transform by the FFT cores 1122_1, 1122_2, ..., 1122_j−1, and 1122_j, and generates a CGH for a 3D object by using the obtained interference patterns of the CGH patches.

Each of the plurality of FFT cores 1122_1, 1122_2, ..., 1122_j−1, and 1122_j may be implemented with circuit logics in which a shift register, a multiplier, and the like for performing an FFT operation are combined. The number of FFT cores 1122_1, 1122_2, ..., 1122_j−1, and 1122_j in the processor 112 may be variously changed in consideration of various factors such as the performance of the processor 112, the resolution of the display apparatus 150, the resolution of images, and the like.

The plurality of FFT cores 1122_1, 1122_2, . . . , 1122_j-1, and 1122_j may perform FFT operations in parallel to perform a double stage Fourier transform (a primary Fourier transform and a secondary Fourier transform), a single stage Fourier transform, or a hybrid Fourier transform, which are to be described below.

Figure 7E:
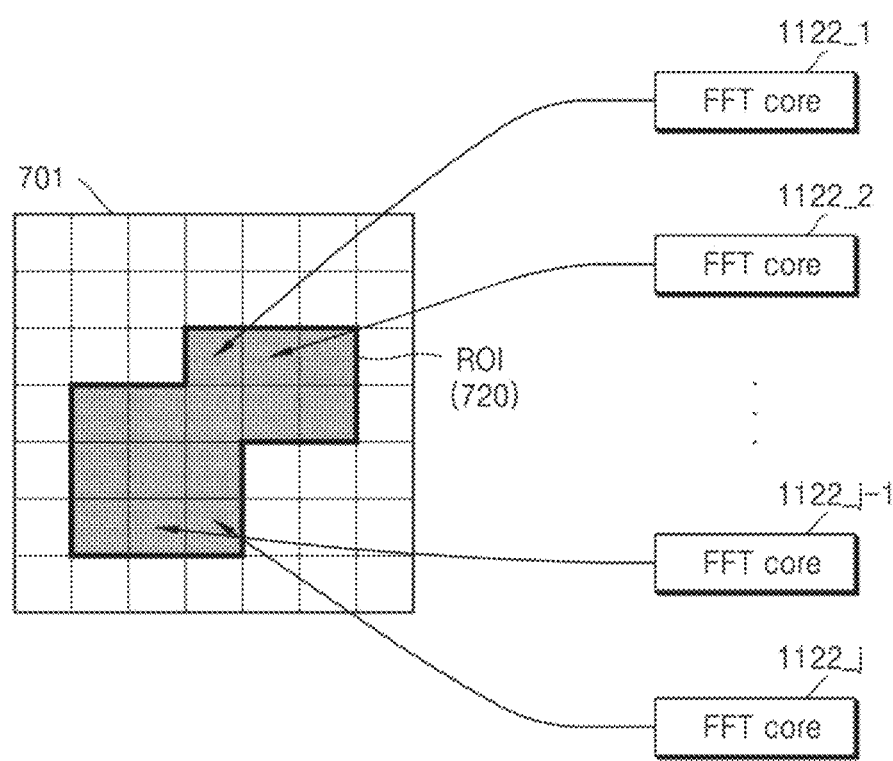
FIG. 7E is a diagram for describing performing a fast Fourier transform (FFT) operation on an ROI by using FFT cores of an FFT core block, according to an embodiment.

FIG. 7E is a diagram for describing performing an FFT operation on an ROI by using FFT cores of an FFT core block, according to an embodiment.

As described above with reference to FIG. 7D, the MCU 1121 of the processor 112 may determine, as the ROI 720, one or more sub-images in which object data is present, among the sub-images 701, and may schedule the operations of the plurality of FFT cores 1122_1, 1122_2, . . . , 1122_j-1, and 1122j such that an efficient FFT operation is performed on the ROI 720.

Specifically, the MCU 1121 may allocate each sub-image corresponding to the ROI 720 to each FFT core, thereby scheduling the operations of the FFT cores 1122_1, 1122_2, . . . , 1122_j-1, and 1122j such that the FFT cores 1122_1, 1122_2, . . . , 1122_j-1, and 1122j perform, in parallel, FFT operations on the sub-images in the ROI 720.

For example, the FFT core 1122_1 may perform an FFT operation on the leftmost sub-image of a first row in the ROI 720, the FFT core 1122_2 may perform an FFT operation on a sub-image positioned in a second column from the left of the first row in the ROI 720, the FFT core 1122j-1 may perform an FFT operation on a sub-image positioned in a second column from the end of a last row in the ROI 720, and the FFT core 1122j may perform an FFT operation on a sub-image positioned in a last column of the last row in the ROI 720. As such, the FFT cores 1122_1, 1122_2, . . . , 1122_j-1, and 1122j may perform, in parallel, FFT operations on the sub-images of the ROI 720 such that efficient FFT operations on the ROI 720 are performed.

For convenience of description, it is shown in FIG. 7E that one sub-image in the ROI 720 is allocated to one FFT core, but the number of sub-images allocated to one FFT core may be changed in various ways by the scheduling of the MCU 1121. In addition, although not specifically shown in FIG. 7E, according to the scheduling of the MCU 1121, the FFT cores 1122_1, 1122_2, . . . , 1122_j-1, and 1122j may perform parallel FFT operations on sub-images having the same depth and may also perform parallel FFT operations on ROIs in depth images having different depths.

Figure 7F:
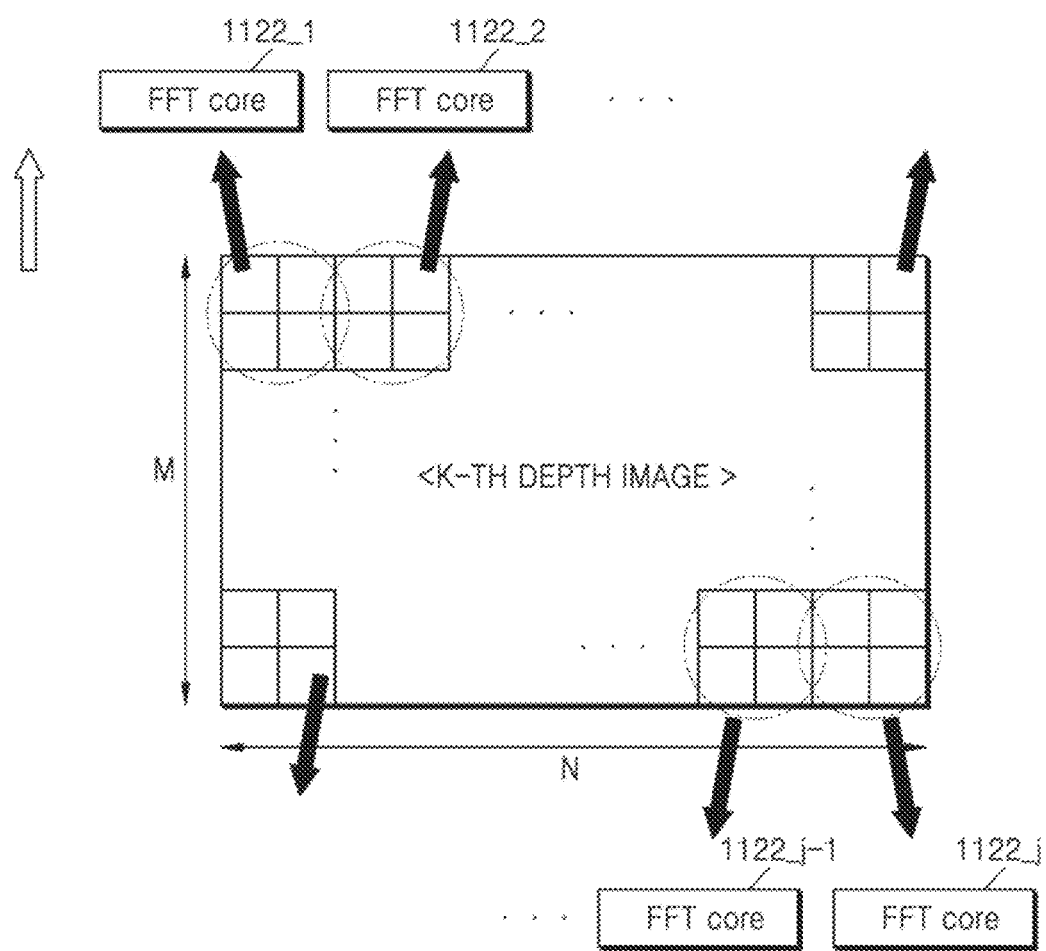
FIG. 7F is a diagram for describing performing an FFT operation by allocating FFT cores of an FFT core block to a pixel at a certain position, according to another embodiment.

FIG. 7F is a diagram for describing performing an FFT operation by allocating FFT cores of an FFT core block to a pixel at a certain position, according to another embodiment.

Referring to FIG. 7F, each of the FFT cores 1122_1, 1122_2, . . . , 1122_j-1, and 1122j may be mapped to a respective pixel array at a certain position in a k-th depth image with M×N resolution and thus may be assigned to perform an FFT operation on the mapped pixel array.

Specifically, when depth images with M×N resolution are grouped into 2×2 pixel arrays, for example, each of the 2×2 pixel arrays may be allocated to one FFT core, and each FFT core may perform an FFT operation on a 2×2 pixel array corresponding thereto.

All of the FFT cores of the FFT core block may be allocated to pixel arrays in one depth image. However, the disclosure is not limited thereto, and some FFT cores of the FFT core block may be assigned to pixel arrays in a depth image of a certain depth, and the remaining FFT cores of the FFT core block may be allocated to pixel arrays in a depth image of another depth. That is, the size of a pixel array to be mapped and the number of FFT cores to be mapped to a depth image of one depth may be variously changed according to the number of FFT cores provided in the FFT core block, the processing performance of the FFT cores, and the like.

As a result, as FFT operations are processed in parallel using FFT cores 1122_1, 1122_2, . . . , 1122_j-1, and 1122j provided in the processor 112 according to the embodiment illustrated in FIG. 7D, efficient CGH processing may be performed.

Figure 8A:
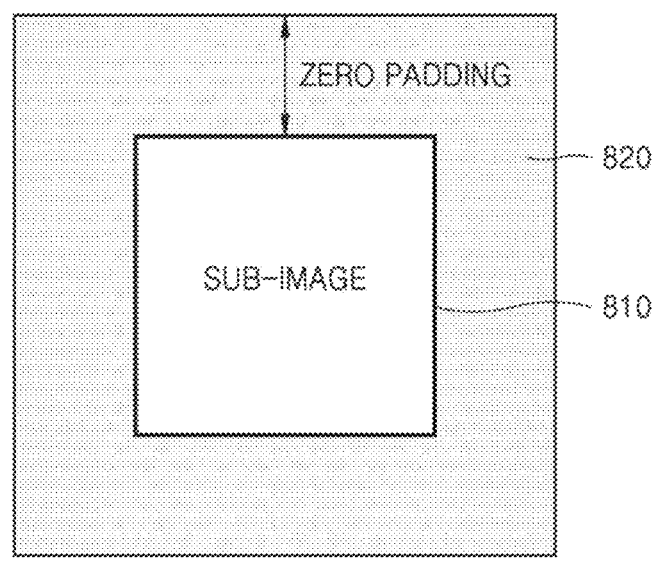

FIGS. 8A and 8B are diagrams for describing zero padding of a sub-image, according to an embodiment.

Referring to FIG. 8A, when propagation of a sub-image is calculated through a Fourier transform, data may be generated to a wider range than the original sub-image size because diffraction occurs. That is, when interference patterns of CGH patches are generated and attached to each other at the original sub-image size, an incorrect diffraction pattern may occur at the sub-image boundary because data of a portion of the interference pattern diffracted beyond an edge of the sub-image is missing. Thus, in order to obtain an interference pattern of a correct CGH patch, propagation needs to be calculated using a wider range than the size of the original sub-image.

Thus, the processor 112 of FIG. 4 performs zero padding 820, in a predetermined range, on the edge of a sub-image 810 determined as an ROI. Then, the processor 112 obtains the interference pattern of the CGH patch by performing Fourier transform on a zero-padded sub-image.

Referring to FIG. 8B, a method for calculating a range of zero padding is shown. As an image propagates, a range in which diffraction occurs may be determined depending on propagation distance, wavelength, and pixel size. For example, a range in which diffraction occurs may be calculated using equations shown in FIG. 8B. $L_{k,min}$ denotes a minimum value of a sub-image size according to the distance to a k-th depth layer. Thus, by subtracting an original sub-image size from $L_{k,min}$, the range of zero padding needed may be obtained. When zero padding is performed on the edge of a sub-image by a diffraction range calculated as described above and then propagation is calculated, the propagation may be calculated to include all data diffracted beyond the edge of the original sub-image. Subsequently, when portions of adjacent interference patterns calculated by the zero padding overlap each other, an interference pattern of a correct CGH patch may be generated. However, as the range of zero padding increases, the resolution also increases, which may affect the amount of computation. Thus, the range of zero padding may be determined to be an appropriate range.

Figure 9:
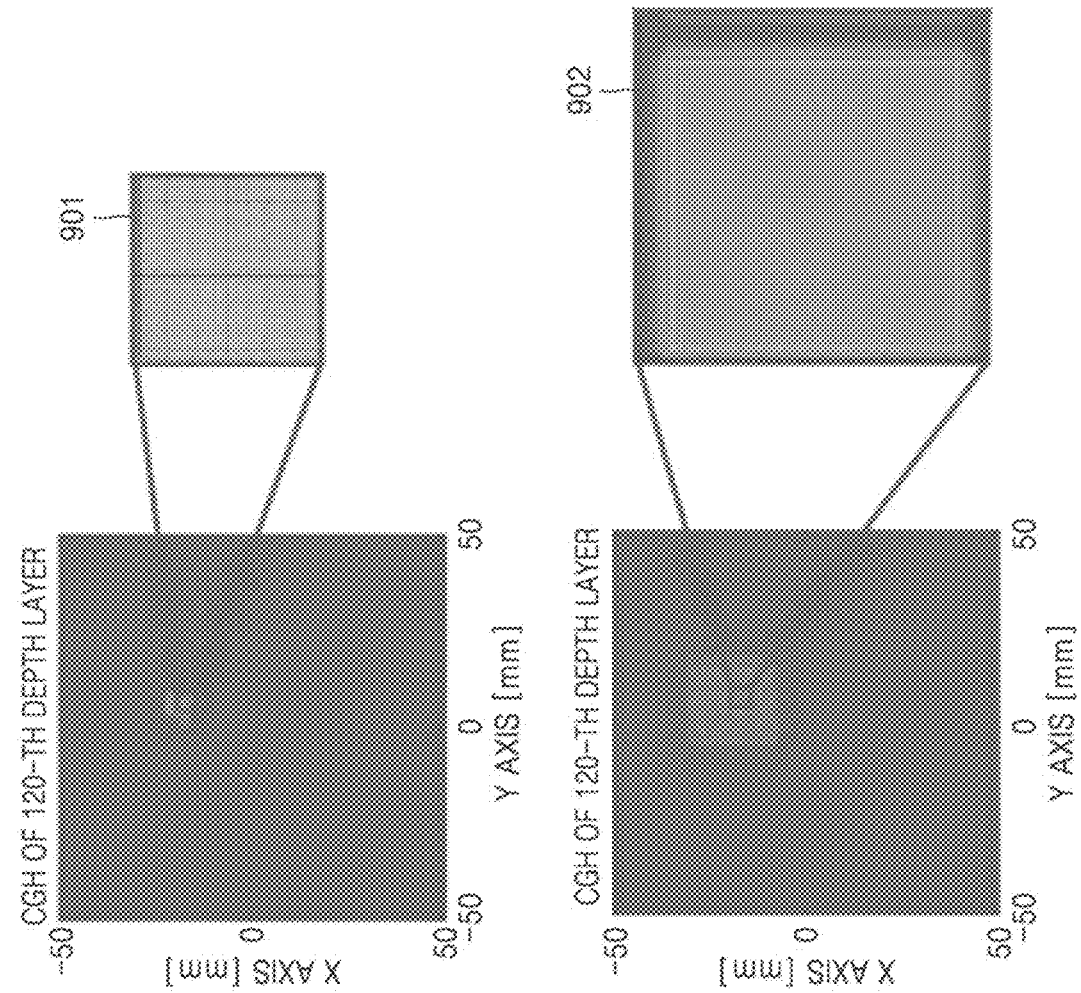
FIG. 9 is a diagram for comparing and describing interference patterns of CGH patches generated based on non-zero padding and zero padding, according to an embodiment.

FIG. 9 is a diagram for comparing and describing interference patterns of CGH patches generated based on non-zero padding and zero padding, according to an embodiment.

Referring to FIG. 9, in an interference pattern 901 of a CGH patch generated based on the non-zero padding, a diffraction pattern is missing and thus a defect phenomenon occurs. However, in contrast, in an interference pattern 902 of a CGH patch generated based on the zero padding, an intact interference pattern may be generated in a zero-padded range.

FIG. 10 is a diagram for describing a simulation result for determining an appropriate range of zero padding, according to an embodiment.

Referring to FIG. 10, a method (Global conv.) of generating a CGH without m×n division takes 270.0919 seconds to generate a CGH. In addition, a method including m×n division in which the range of zero padding is set to 100%

(full) takes 226.4386 seconds to generate a CGH, and thus, CGH generation times of the two methods are little different. On the other hand, in cases where the range of zero padding is about 30% or more, there is little difference in deviation. Thus, even if the range of zero padding is set to about 30%, efficient computational performance may be obtained in terms of calculation time and deviation.

As described with reference to FIGS. 5 to 10, the processor 112 in FIG. 4 may divide a depth image of M×N resolution into m×n sub-images (i.e., patches) and then perform CGH processing (FFT operation, etc.) on each of the sub-images individually. In addition, the processor 112 may select only ROI sub-images, in which object data is present, among the divided sub-images to perform CGH processing. Furthermore, the processor 112 may perform CGH processing after first completing zero padding on the ROI sub-images.

Figure 11:
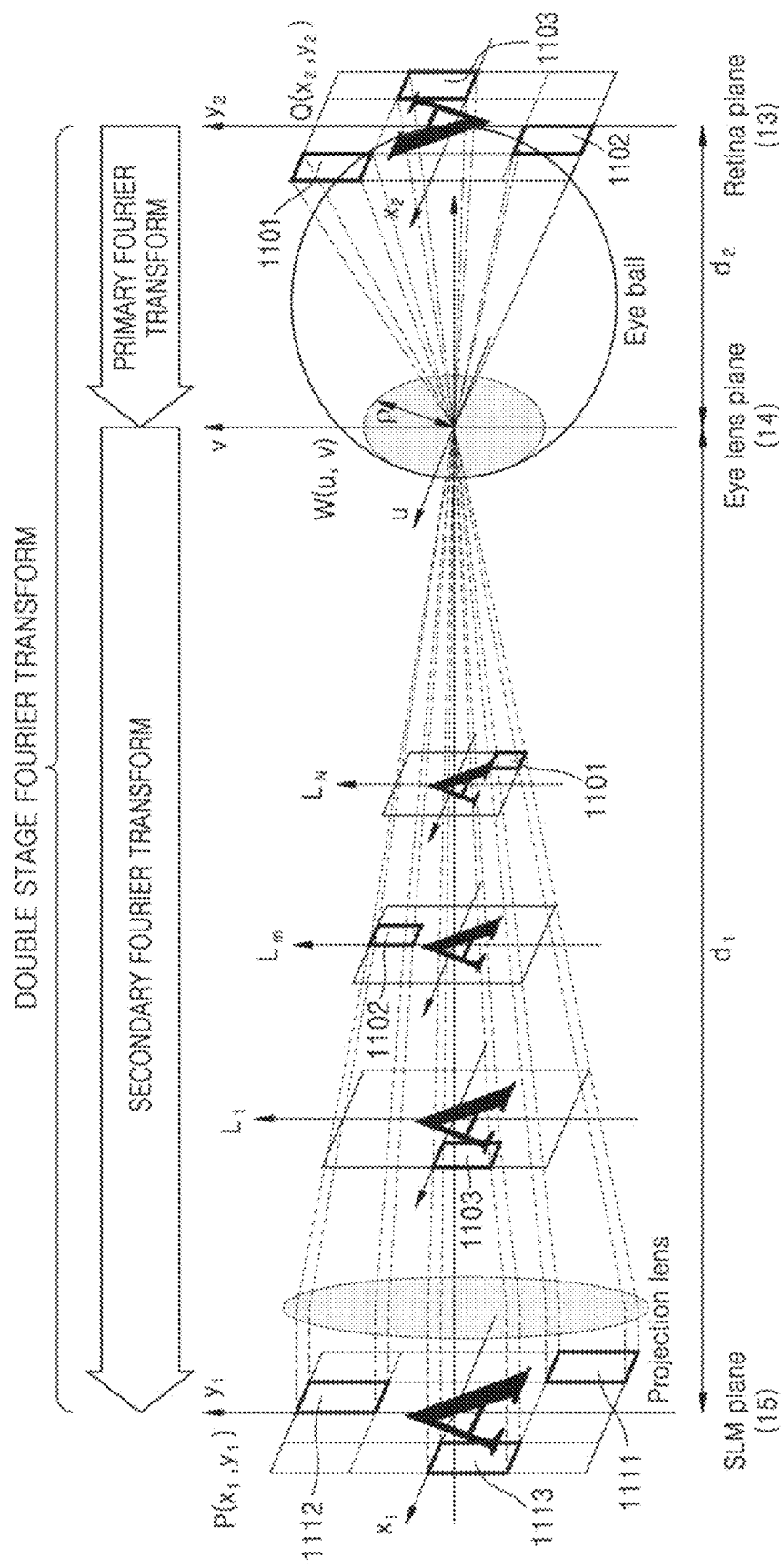
FIG. 11 is a diagram for describing a double stage Fourier transform according to an embodiment.

FIG. 11 is a diagram for describing a double stage Fourier transform according to an embodiment.

Referring to FIG. 11, a double stage Fourier transform performs a primary Fourier transform for calculating the propagation of a light wave from an observer's retina plane 13 to the observer's eye lens plane 14 with respect to an image (i.e., a depth image) focused on the observer's retina plane 13, and a secondary Fourier transform for calculating the propagation of a light wave from the eye lens plane 14 to a CGH plane 15.

As described above, Fourier transform in CGH processing is an operation for obtaining a distribution of diffracted images obtained by Fresnel diffraction of an image and corresponds to GFT or Fresnel transform. In embodiments, the Fourier transform may include an inverse Fourier transform, an FFT, a GFT, a Fresnel transform, and the like, which are operations using the Fourier transform.

ROIs 1101, 1102, and 1103 respectively determined in depth images of different depth layers $L_N$, $L_m$, and $L_1$ may be processed independently or in parallel.

Specifically, the processor 112 of FIG. 4 performs a primary Fourier transform for calculating the propagation of a light wave from the retina plane 13 to the eye lens plane 14, with respect to a sub-image (in this case, the sub-image may denote a zero-padded sub-image) corresponding to the ROI 1101 of the depth image of the depth layer $L_N$ projected onto the retina plane 13. The processor 112 applies (e.g., multiplies) a phase profile of the eye lens plane 14 to the result of performing the primary Fourier transform, and then performs a secondary Fourier transform for calculating the propagation of a light wave from the eye lens plane 14 to the CGH plane 15. The processor 112 applies (e.g., multiplies) a phase profile of a projection lens to the result of performing the secondary Fourier transform, and then obtains an interference pattern 1111 of a CGH patch at a patch position on the CGH plane 15, which corresponds to a patch position of the ROI 1101 of the depth image, based on the result of applying the phase profile of the projection lens. The processor 112 performs the same double stage Fourier transform on a sub-image corresponding to the ROI 1102 of the depth image of the depth layer $L_M$ and a sub-image corresponding to the ROI 1103 of the depth image of the depth layer $L_1$, thereby obtaining interference patterns 1112 and 1113 of CGH patches. In this case, as described above, CGH processing for ROIs 1101, 1102, and 1103 may be processed independently or in parallel by different processing cores (or processing units) in the processor 112.

When the interference patterns 1111, 1112, and 1113 of the CGH patches for all of the ROIs 1101, 1102, and 1103 are obtained, the processor 112 merges the obtained interference patterns 1111, 1112, and 1113 of the CGH patches to obtain an interference pattern (i.e., a global interference pattern) of a global CGH in the entire area of the CGH plane 15, thereby generating a CGH. In this case, in the process of merging the interference patterns 1111, 1112, and 1113 of the CGH patches, ranges of zero padding may overlap each other.

Although only three depth layers $L_1$, $L_m$, and $L_N$ are illustrated in FIG. 11 for convenience of description, embodiments are not limited thereto and various numbers of depth layers and various numbers of ROIs may be processed to generate a CGH.

Figure 12:
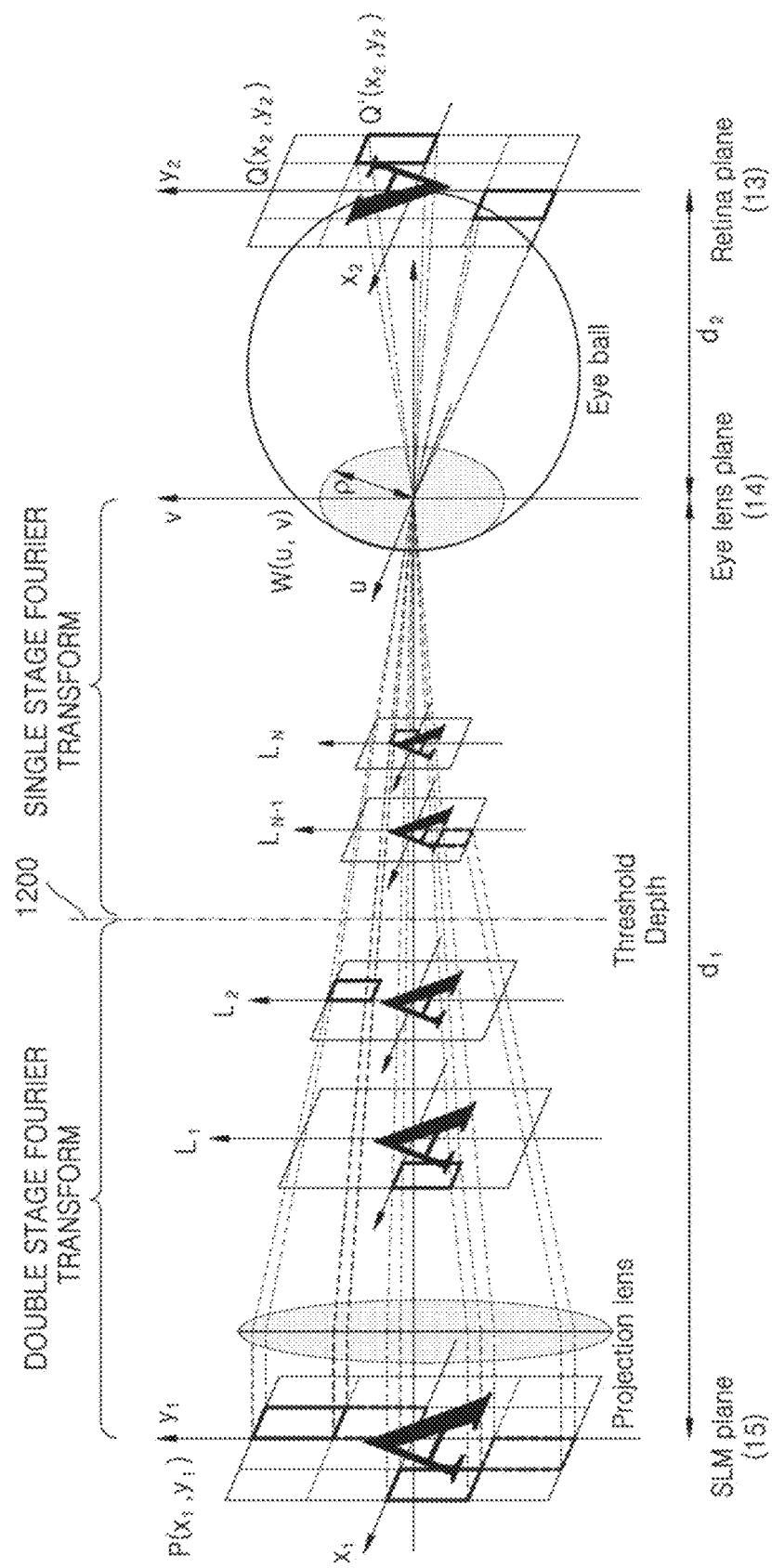
FIG. 12 is a diagram for describing a hybrid Fourier transform according to an embodiment.

FIG. 12 is a diagram for describing a hybrid Fourier transform according to an embodiment.

Referring to FIG. 12, unlike in a CGH processing operation using only the double stage Fourier transform of FIG. 11, the processor 112 of FIG. 4 may obtain an interference pattern of a CGH patch by using a hybrid Fourier transform.

The hybrid Fourier transform refers to an operation of selectively performing both a double stage Fourier transform and a single stage Fourier transform. Specifically, the hybrid Fourier transform refers to performing a single Fourier transform on a depth image (i.e., ROI sub-images) of a depth layer having a depth that is greater than a threshold depth 1200 and performing a double stage Fourier transform on a depth image (i.e., ROI sub-images) of a depth layer having a depth that is less than the threshold depth 1200. In this case, the depth layer that is greater than the threshold depth 1200 refers to a depth layer at a depth relatively close to an eye ball, and the depth layer that is less than the threshold depth 1200 refers to a depth layer at a depth relatively close to the CGH plane 15.

The threshold depth 1200 may be determined and changed by various factors such as a user setting, the number of depth layers, and the performance of the 3D holographic image processing apparatus 100. Alternatively, the processor 112 may determine the threshold depth 1200 based on a threshold depth condition described below with reference to FIG. 14A.

The single stage Fourier transform will be described with reference to the accompanying drawings.

Figure 13A:
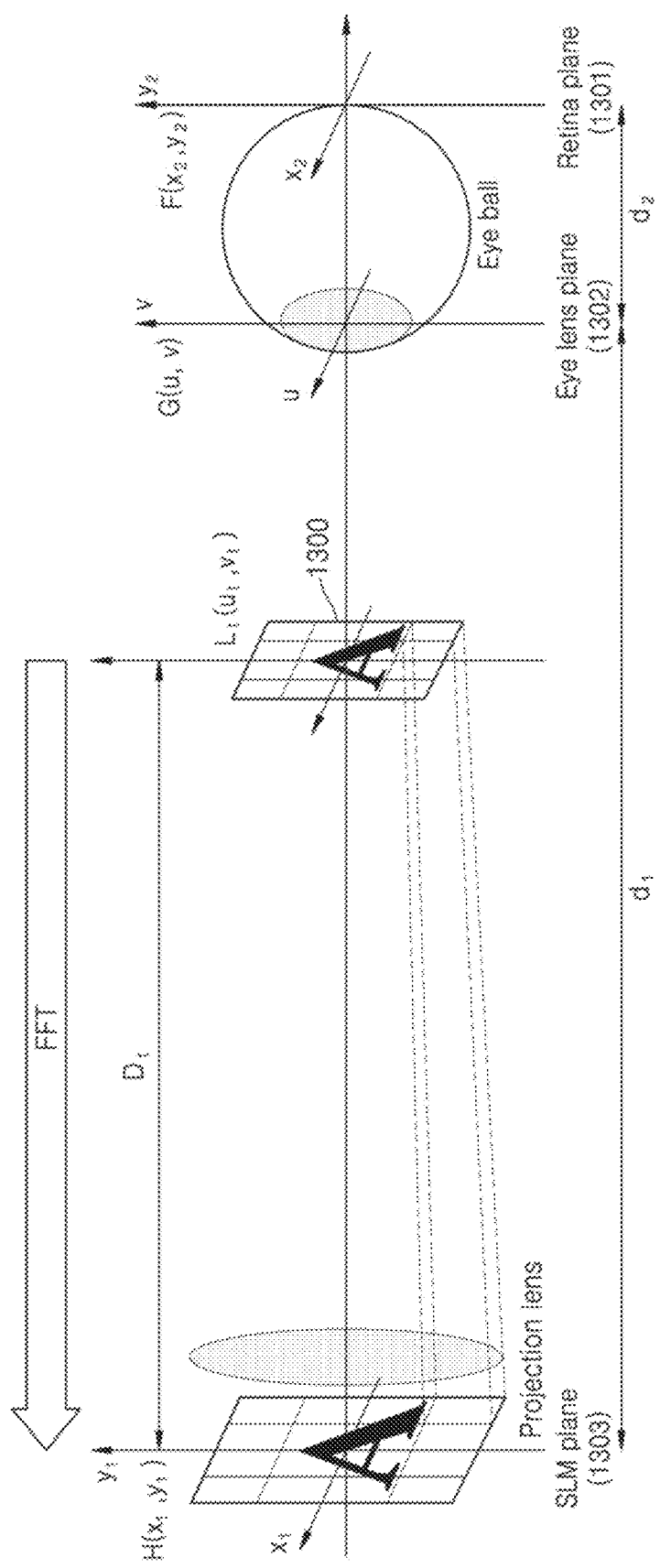
FIG. 13A is a diagram for describing a single stage Fourier transform according to an embodiment.

FIG. 13A is a diagram for describing a single stage Fourier transform according to an embodiment.

Referring to FIG. 13A, unlike the double stage Fourier transform in which two Fourier transforms are performed, first from a retina plane $F(x_2, y_2)$ 1301 to an eye lens plane $G(u, v)$ 1302 and then from the eye lens plane $G(u, v)$ 1302 to a CGH plane $H(x_1, y_1)$ 1303, the single stage Fourier transform refers to an operation of obtaining an interference pattern of a CGH patch through only one Fourier transform from a depth layer $L_t(u_t, v_t)$ 1300 directly to the CGH plane 1303.

Since a CGH interference pattern is generated based on a Fresnel transform (Fourier transform), the CGH interference pattern may be calculated only for a portion where diffraction ranges of the image overlap each other. Thus, since a depth image without the m×n subdivision described with reference to FIG. 3 (or the case 501 of FIG. 5) is large in size, the propagation from a depth layer to the CGH plane 1303 may be calculated only when the depth layer is significantly far from the CGH plane 1303 in order for a diffraction overlap to occur sufficiently. However, for small-sized sub-images, such as sub-images of a depth image with the m×n subdivision described above (e.g., the case 502 of FIG. 5), it is possible to directly calculate a CGH interference pattern even at a short distance from the CGH plane 1303. In embodiments, an operation using this principle is defined as a single stage Fourier transform.

The hybrid Fourier transform described above with reference to FIG. 12 refers to an operation of using both the single stage Fourier transform and the double stage Fourier transform based on a threshold depth.

When the determination of the ROI is completed, the processor 112 of FIG. 4 may perform CGH processing on a sub-image of the ROI by using at least one of CGH processing using a dual stage Fourier transform, CGH processing using a hybrid Fourier transform, and CGH processing using a single stage Fourier transform.

Figure 13B:
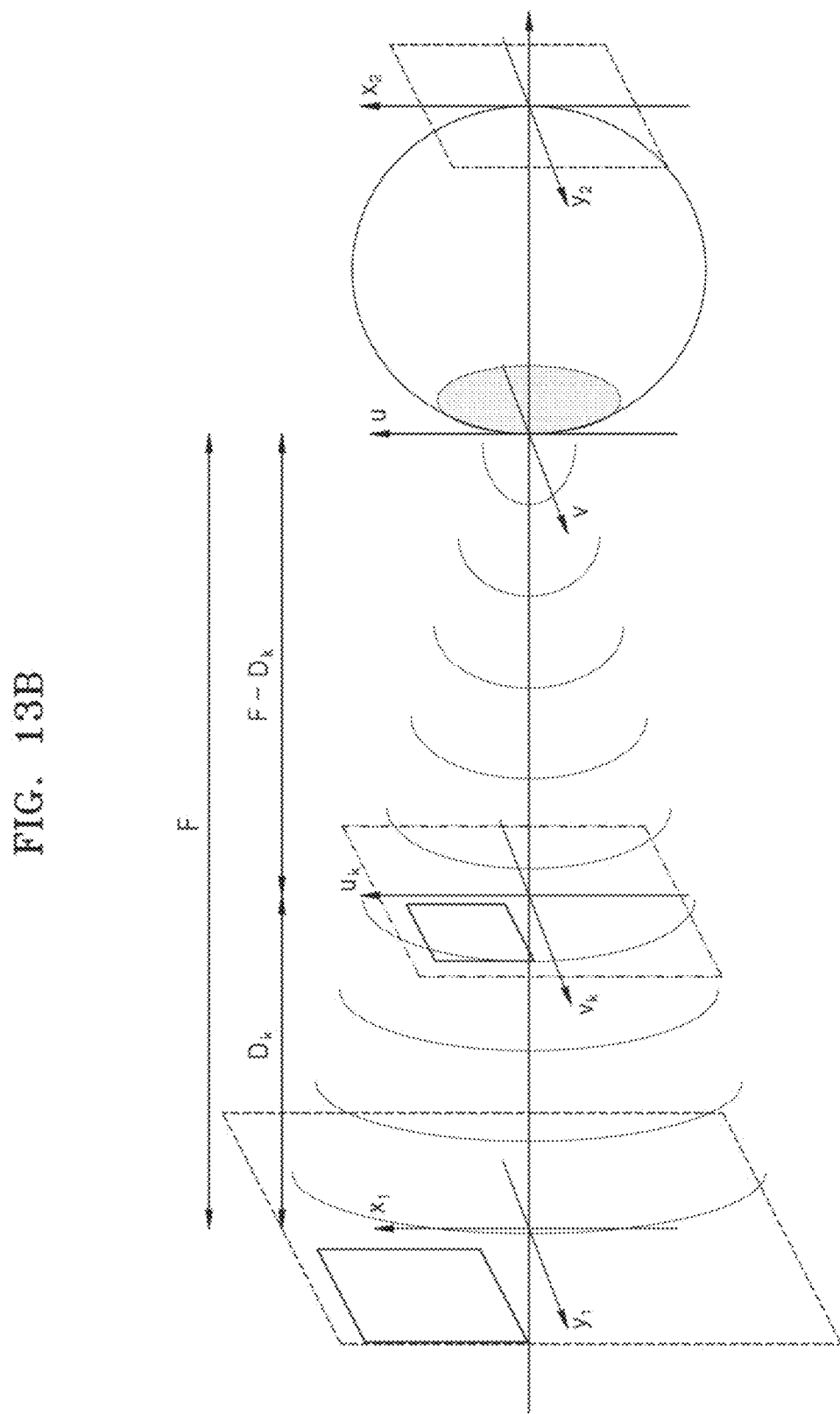
FIG. 13B is a diagram for describing a spherical carrier wave in a 3D space according to an embodiment.

FIG. 13B is a diagram for describing a spherical carrier wave in a 3D space according to an embodiment.

Referring to FIG. 13B, the spherical carrier wave refers to a change in size and position of a phase during a Fourier transform (i.e., FFT) process for calculating propagation. Since information regarding the spherical carrier wave propagated through the region F-$D_k$ as shown in FIG. 13B is omitted in the single stage Fourier transform, the image may be made smaller without being properly enlarged according to a distance from an eye ball. Thus, there is a need to calculate convolution with respect to the influence of the spherical carrier wave.

Figure 13C:
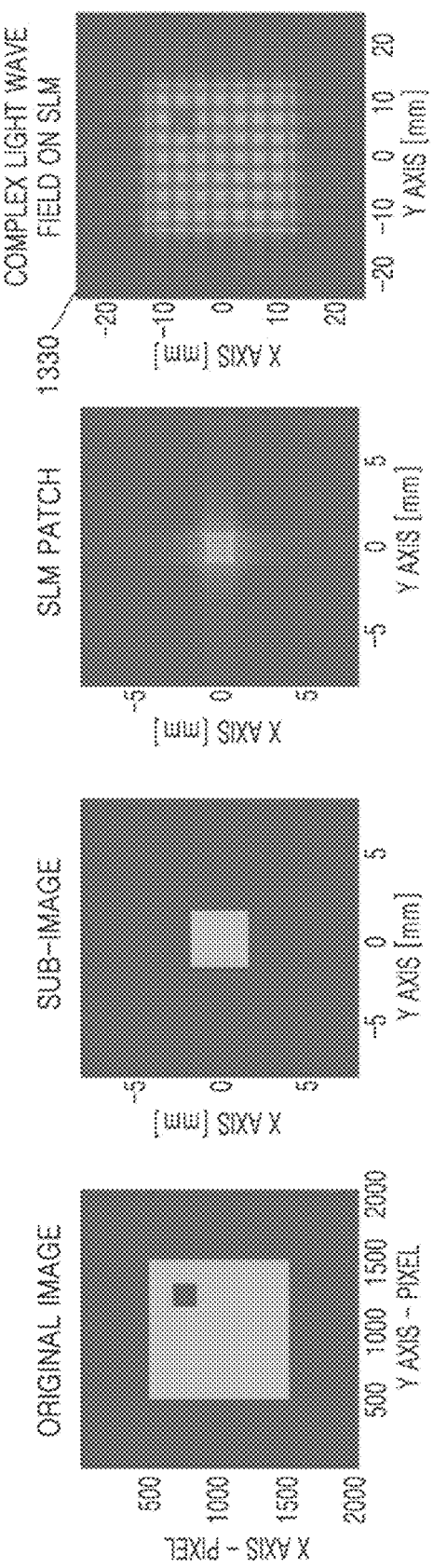
FIG. 13C is a diagram for describing simulation results when the influence of an omitted spherical carrier wave is not considered.

FIG. 13C is a diagram for describing simulation results when the influence of an omitted spherical carrier wave is not considered.

Referring to FIG. 13C, a result 1330 of generating a CGH interference pattern without considering the spherical carrier wave propagated through the region F-$D_k$ is shown. As the image is not enlarged to the full size, the size of the CGH patch (SLM patch) is smaller than that of the sub-image. Accordingly, even if interference patterns of CGH patches (interference patterns of SLM patches) are stamped, the interval between the CGH patches (SLM patches) is widened because the sizes of the CGH patches (SLM patches) are relatively small compared to the sizes of the sub-images.

Because each of the depth images is divided into sub-images and in the sub-images (or ROI sub-images) the position of a CGH patch (SLM patch) is determined through stamping by the position of a corresponding sub-image rather than by a linear carrier wave, the phase of a center portion of the spherical carrier wave is cut by a sub-image size and multiplied by all the sub-images. Through this calculation, the size of the corresponding image may be accurately enlarged using only a spherical carrier wave element except for a linear carrier wave element that generates an image shift.

Figure 13D:
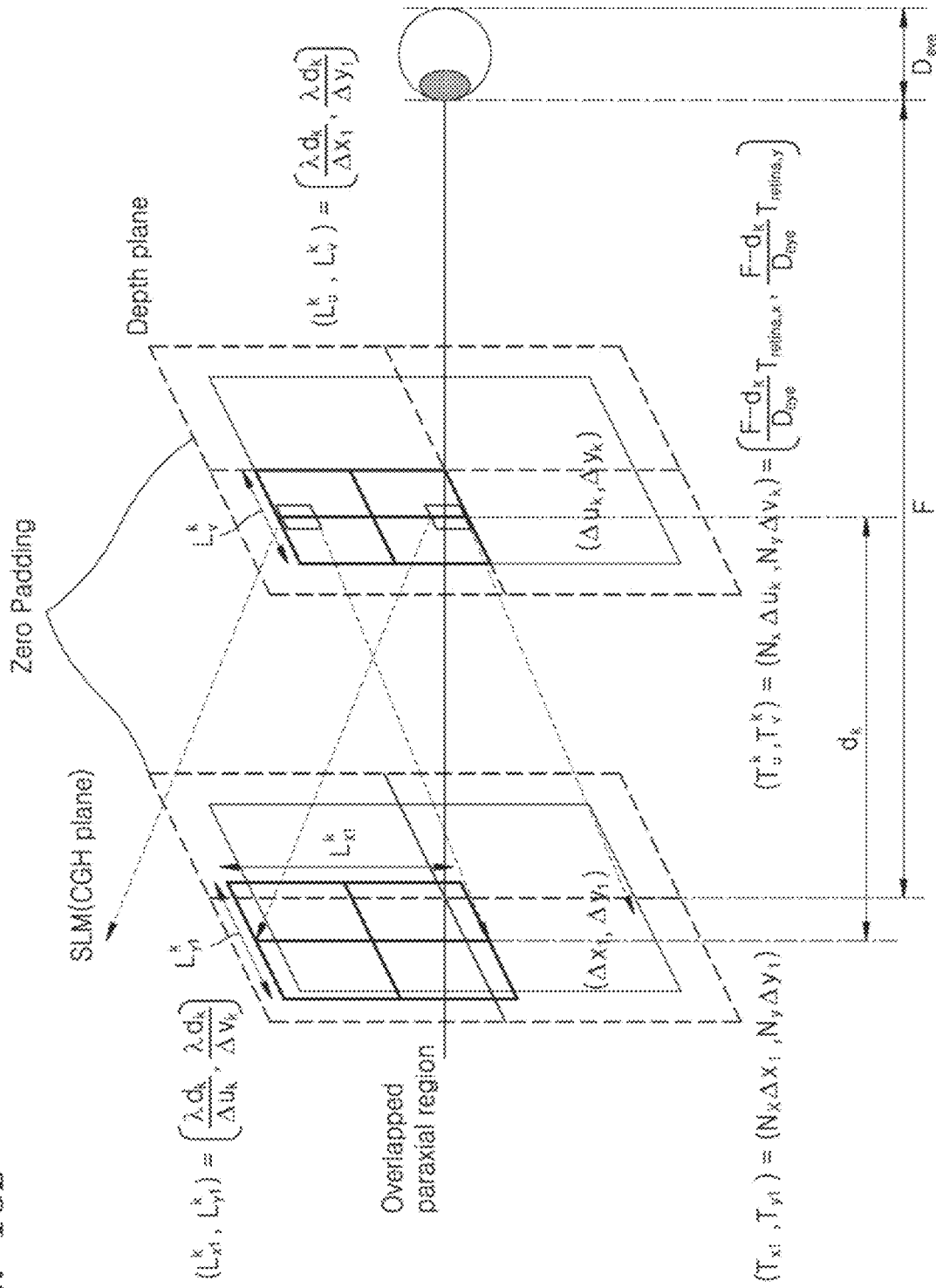
FIGS. 13D and 13E are diagrams for describing sampling grid matching between a depth layer and a spatial light modulator (SLM) plane (or CGH plane) according to an embodiment.
Figure 13E:
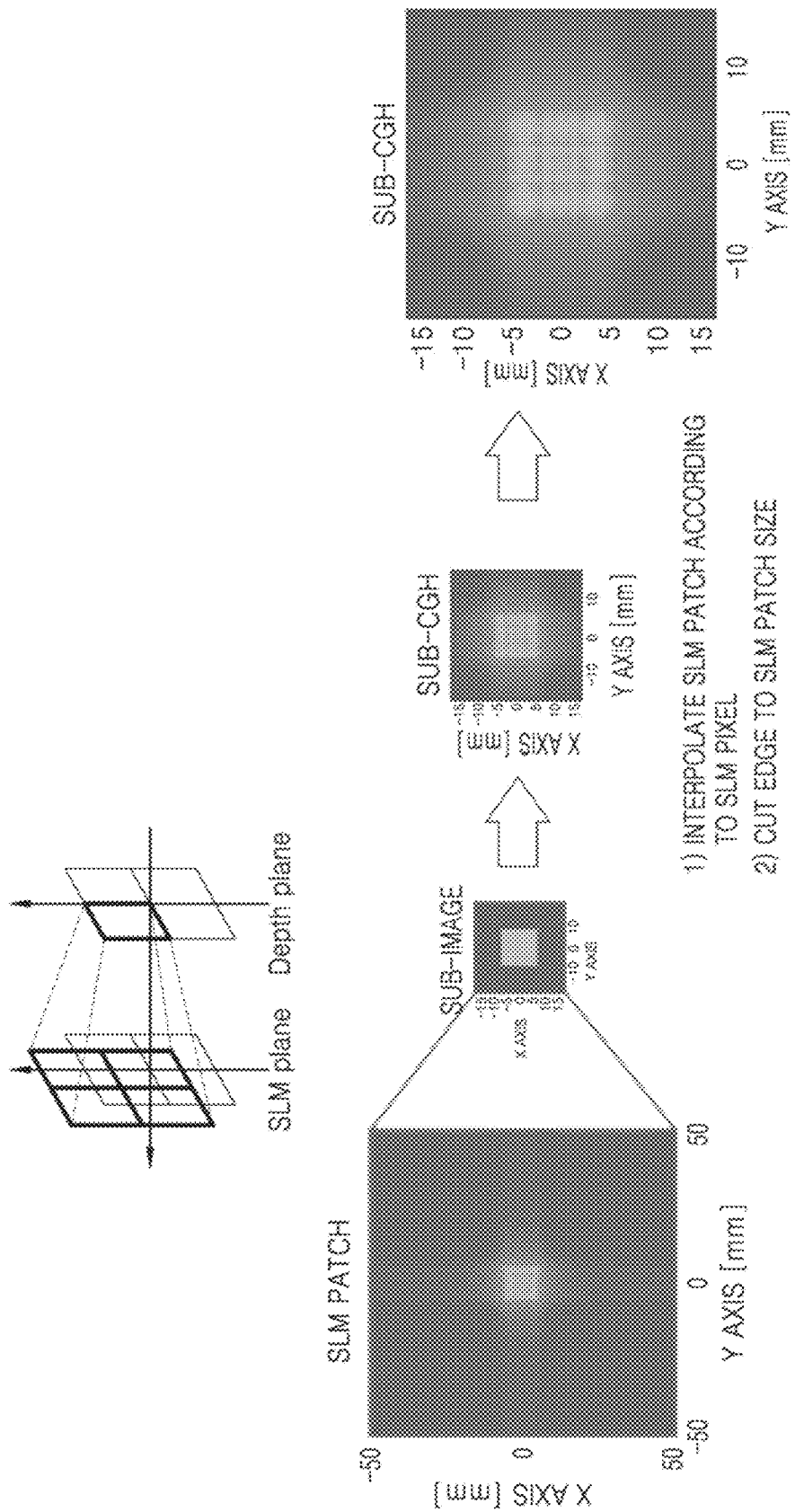

FIGS. 13D and 13E are diagrams for describing sampling grid matching between a depth layer and a CGH plane according to an embodiment.

Referring to FIG. 13D, when a CGH patch is obtained by propagating an image from a depth layer to a CGH plane by a single stage Fourier transform, the size of the CGH patch increases due to diffraction. In this case, when the CGH patch having an increased size is stamped on the CGH plane as it is, the CGH patch having the increased size does not match with the CGH plane, and thus, sampling grid matching between the depth layer and the CGH plane is required.

Referring to equations shown in FIG. 13D, the patch size of the CGH plane may be expressed as Expression 4, and the total size of the CGH plane may be expressed as Expression 5. In addition, the total size of a depth image of the depth layer may be expressed as 6.

$$(L_{x1}^k, L_{y1}^k) = \left(\frac{\lambda d_k}{\Delta u_k}, \frac{\lambda d_k}{\Delta v_k}\right) \quad \text{[Expression 4]}$$

($L$: patch size, $\lambda$: wavelength, $d_k$: distance between planes, and $\Delta$: pixel)

$$(T_{x1}, T_{y1}) = (N_x \Delta x_1, N_y \Delta y_1) \quad \text{[Expression 5]}$$

($T$: total size, $N$: resolution)

$$(T_u^k, T_v^k) =$$
$$(N_x \Delta u_k, N_y \Delta v_k) = \left(\frac{F - d_k}{D_{eye}} T_{retina,x}, \frac{F - d_k}{D_{eye}} T_{retina,y}\right) \quad \text{[Expression 6]}$$

($F$: focal length, and $D_{eye}$: distance between eye lens and retina)

Referring to FIG. 13E, since the sampling grid of a generated CGH patch has a different diffraction overlap range depending on the distance to the depth layer and varies for each depth layer and also is different from the size of the CGH plane, matching of the sampling grid to the CGH plane is required. Thus, the processor 112 interpolates the generated CGH patch to a size (that is, resolution) that fits the sampling grid of the CGH plane, and then performs a process of cutting an edge according to the size of the CGH plane.

That is, the processor 112 obtains an interference pattern by performing convolution of a spherical wave on a sub-image corresponding to an ROI, performing zero padding to a predetermined range on the edge of the sub-image corresponding to the ROI, and performing a single stage Fourier transform on the zero-padded sub-image, and obtains interference patterns of a CGH patch by performing interpolation for matching the interference pattern to the sampling grid of a spatial light modulator (SLM).

Figure 14B:
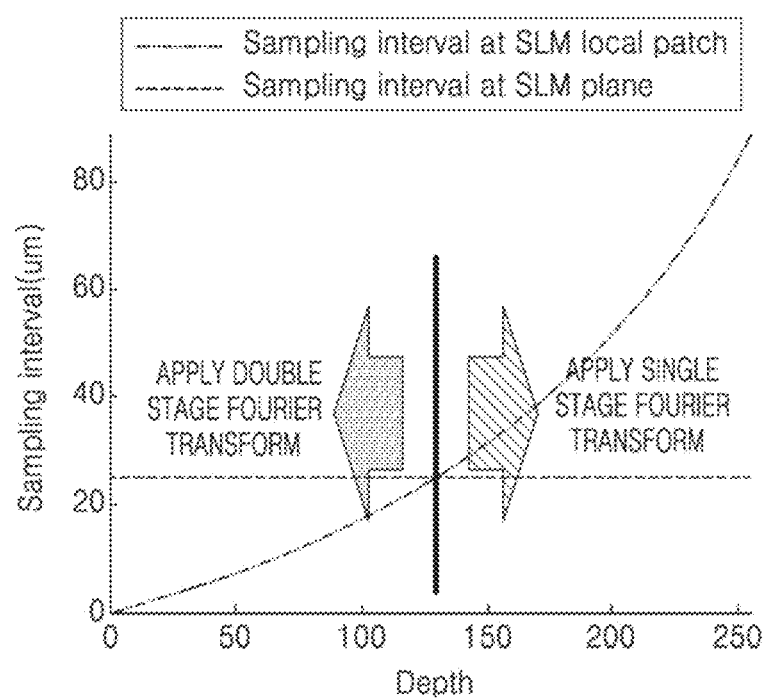

FIGS. 14A and 14B are diagrams for describing a method of determining a threshold depth when performing a hybrid Fourier transform according to an embodiment.

Referring to FIG. 14A, a single stage Fourier transform may be applicable when a diffraction overlap range is greater than a size of an SLM patch (CGH patch) of a CGH plane. That is, since the diffraction overlap range may increase only when a depth layer is somewhat distant from the CGH plane, it is possible to apply a single stage Fourier transform. Thus, when the processor 112 in FIG. 4 performs the hybrid Fourier transform, the processor 112 performs a double stage Fourier transform on a depth layer with a short distance between the CGH plane and the depth layer, and performs a single stage Fourier transform on a depth layer with a long distance between the CGH plane and the depth layer. To determine whether the distance between the CGH plane and a depth layer is short or long, a threshold depth may be determined.

If the diffraction overlap range is greater than the size of the CGH plane, it means that the size of the sampling interval for an SLM patch (CGH patch) before the interpolation is greater than the size of the sampling interval for the CGH plane. Thus, using equations shown in FIG. 14A, it may be seen how the size of the sampling interval of the SLM patch changes according to the distance from the CGH plane to the depth layer. When the equations are represented in graphs, the sampling interval of the SLM patch (CGH patch) increases with increasing distance from the depth layer, as shown in FIG. 14B, and a single stage Fourier transform may be performed beginning at a point at which the sampling interval of the SLM patch (CGH patch) is greater than the sampling interval of the CGH plane. Thus, the threshold depth may be determined based on a threshold depth condition 1350 shown in FIG. 14A.

Figure 15:
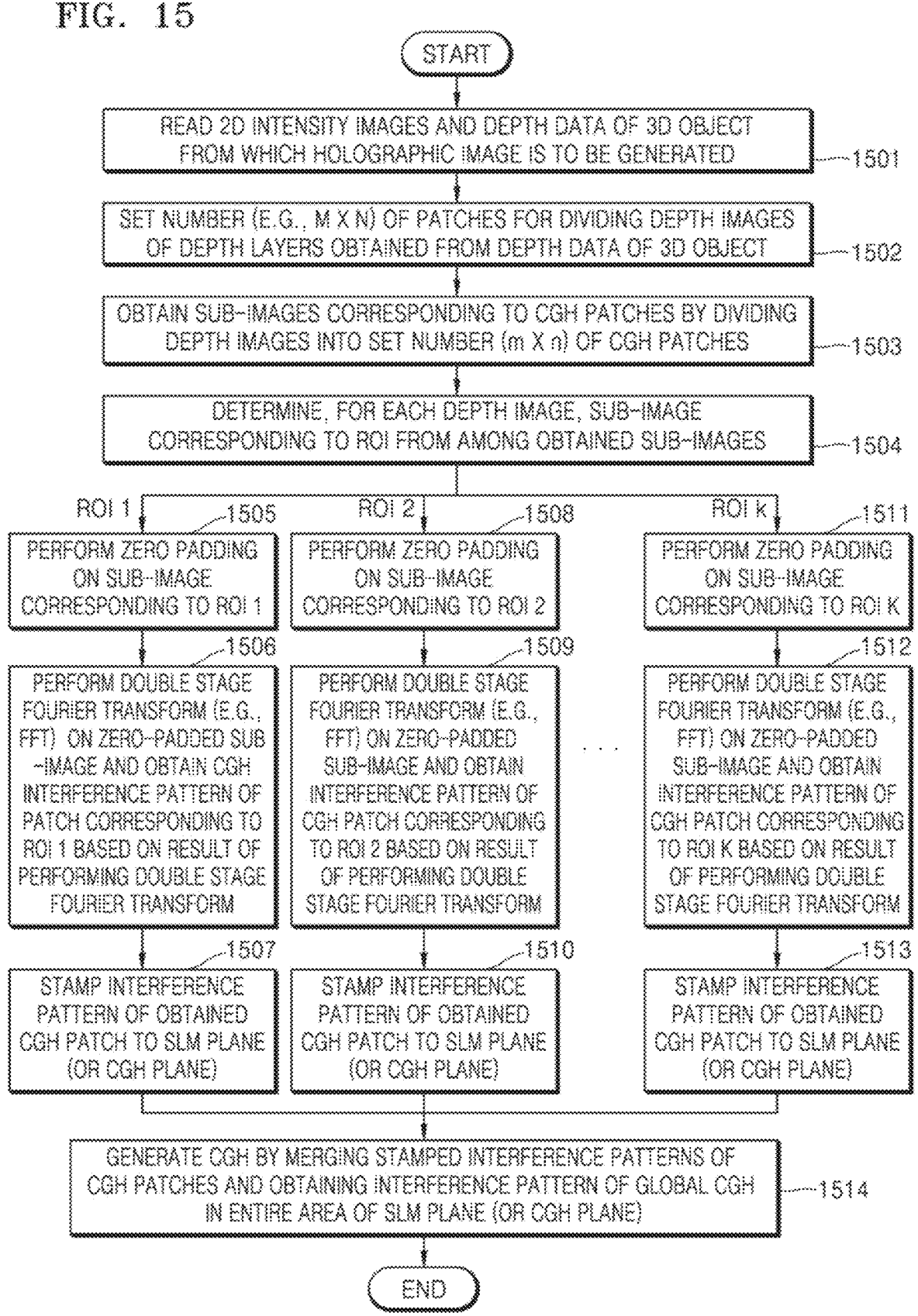
FIG. 15 is a flowchart of a method of performing CGH processing by dividing a depth image into sub-images, according to an embodiment.

FIG. 15 is a flowchart of a method of performing CGH processing by dividing a depth image into sub-images, according to an embodiment. Referring to FIG. 15, since the method of performing the CGH processing is related to the embodiments described with reference to the above-described drawings, the descriptions given above with reference to the above-described drawings may be applied to the method of FIG. 15, even if omitted below.

In operation 1501, the processor 112 in FIG. 4 reads 2D intensity images and depth data of a 3D object from which a holographic image is to be generated.

In operation 1502, the processor 112 sets the number (e.g., m×n) of patches into which the depth images of depth layers obtained from the depth data of the 3D object may be divided.

In operation 1503, the processor 112 obtains sub-images corresponding to the patches by dividing the depth images into the set number (m×n) of CGH patches.

In operation 1504, the processor 112 determines, for each depth image, one or more sub-images corresponding to an ROI from among the obtained sub-images. For example, ROI 1 to ROI k may be determined (where k is a natural number).

In operation 1505, the processor 112 performs zero padding on a sub-image corresponding to ROI 1.

In operation 1506, the processor 112 performs a double stage Fourier transform (e.g., FFT) on the zero-padded sub-image and obtains an interference pattern of a CGH patch corresponding to ROI 1 based on the result of performing the double stage Fourier transform.

In operation 1507, the processor 112 stamps the interference pattern of the obtained CGH patch to the CGH plane.

In operations 1508 to 1510, the processor 112 performs CGH processing corresponding to operations 1505 to 1507 on a sub-image corresponding to ROI 2 to thereby stamp an interference pattern of a CGH patch corresponding to ROI 2 on the CGH plane.

In operations 1511 to 1513, the processor 112 performs CGH processing corresponding to operations 1505 to 1507 on a sub-image corresponding to ROI k to thereby stamp an interference pattern of a CGH patch corresponding to ROI k on the CGH plane.

The processor 112 may perform the processing of operations 1505 to 1507, the processing of operations 1508 to 1510, and the processing of operations 1511 to 1513 independently or in parallel.

In operation 1514, the processor 112 generates a CGH by merging the stamped interference patterns of the CGH patches and obtaining an interference pattern (i.e., a global interference pattern) of a global CGH in the entire area of the CGH plane.

Figure 16A:
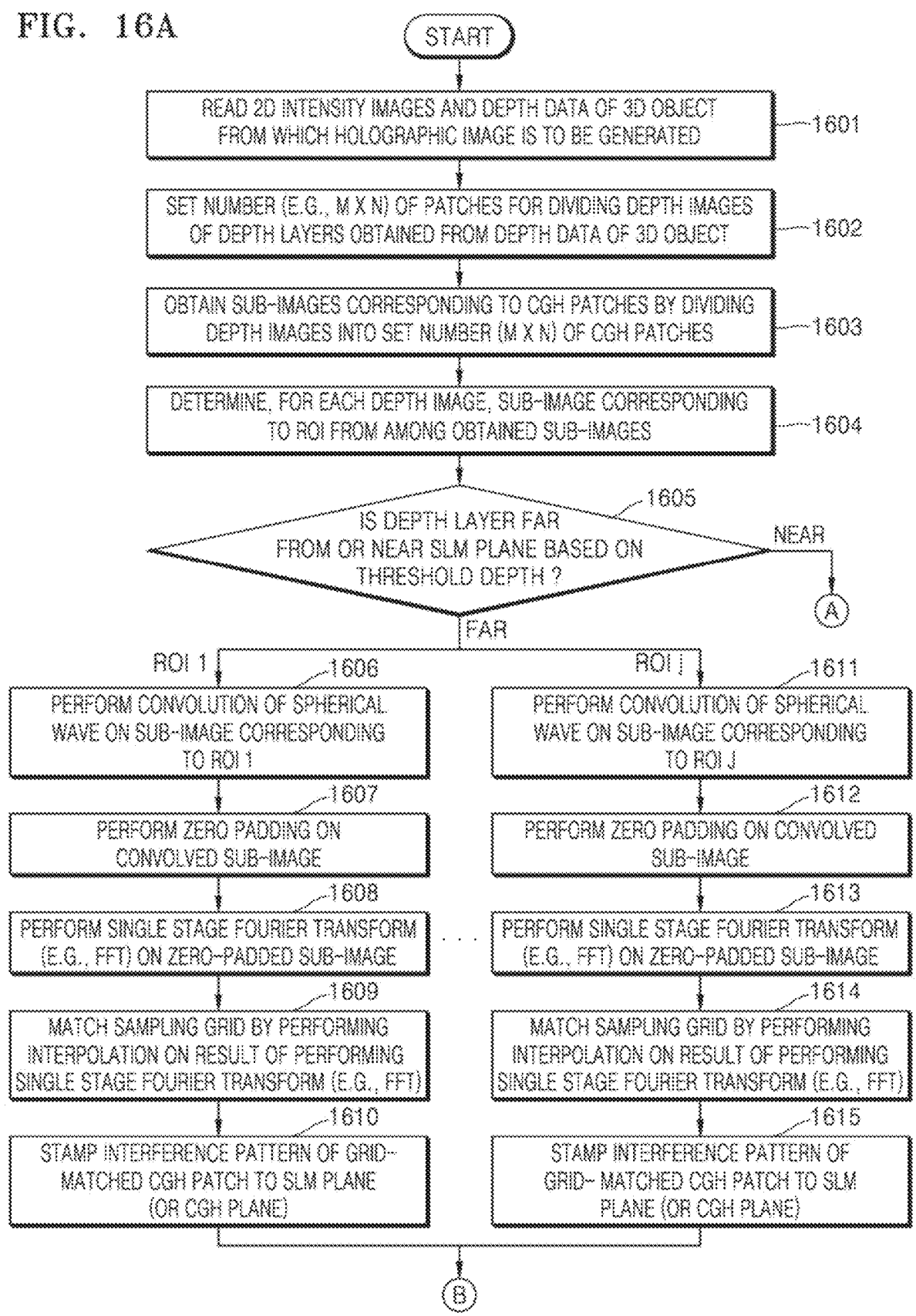
FIGS. 16A and 16B are flowcharts of a method of performing CGH processing based on a hybrid Fourier transform by dividing a depth image into sub-images, according to an embodiment.
Figure 16B:
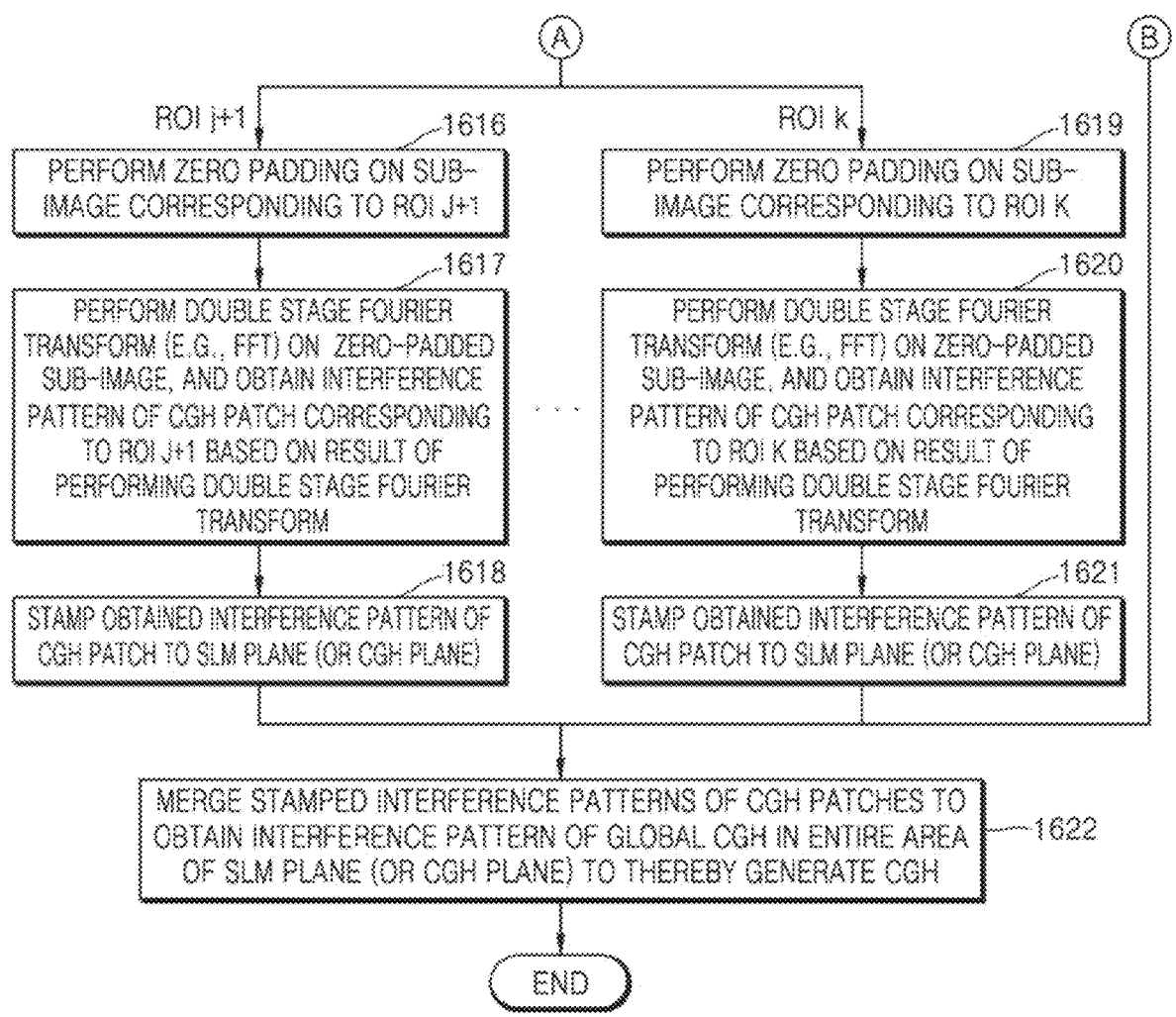

FIGS. 16A and 16B are flowcharts of a method of performing CGH processing based on a hybrid Fourier transform by dividing a depth image into sub-images, according to an embodiment. Referring to FIGS. 16A and 16B, since the method of performing the CGH processing is related to embodiments described with reference to the above-described drawings, the descriptions given above with reference to the above-described drawings may be applied to the method of FIGS. 16A and 16B, even if omitted below.

In operation 1601, the processor 112 in FIG. 4 reads 2D intensity images and depth data of a 3D object from which a holographic image is to be generated.

In operation 1602, the processor 112 sets the number (e.g., m×n) of patches into which the depth images of depth layers obtained from the depth data of the 3D object may be divided.

In operation 1603, the processor 112 obtains sub-images corresponding to the patches by dividing the depth images into the set number (m×n) of CGH patches.

In operation 1604, the processor 112 determines, for each depth image, one or more sub-images corresponding to an ROI from among the obtained sub-images.

In operation 1605, the processor 112 determines whether a depth layer of each depth image is far from or near the CGH plane based on a threshold depth. If it is determined that the depth layer of each depth image is far from the CGH plane, the processor 112 performs operations 1606 and 1611. However, if it is determined that the depth layer of each depth image is near the CGH plane, the processor 112 performs operations 1616 and 1619 shown in FIG. 16B.

In operation 1606, the processor 112 performs convolution of a spherical wave on a sub-image corresponding to ROI 1.

In operation 1607, the processor 112 performs zero padding on the convolved sub-image.

In operation 1608, the processor 112 performs a single stage Fourier transform (e.g., FFT) on the zero-padded sub-image.

In operation 1609, the processor 112 matches a sampling grid by performing interpolation on the result of performing the single stage Fourier transform (e.g., FFT).

In operation 1610, the processor 112 stamps an interference pattern of a grid-matched CGH patch to the CGH plane.

In operations 1611 to 1615, the processor 112 performs CGH processing corresponding to operations 1606 to 1610 on a sub-image corresponding to ROI j to thereby stamp an interference pattern of a CGH patch corresponding to ROI j on the CGH plane (where j is a natural number).

In operation 1616, the processor 112 performs zero padding on a sub-image corresponding to ROI j+1.

In operation 1617, the processor 112 performs a double stage Fourier transform (e.g., FFT) on the zero-padded sub-image, and obtains an interference pattern of a CGH patch corresponding to ROI j+1 based on the result of performing the double stage Fourier transform.

In operation 1618, the processor 112 stamps the obtained interference pattern of the CGH patch to the CGH plane.

In operations 1619 to 1621, the processor 112 performs CGH processing corresponding to operations 1616 to 1618 on a sub-image corresponding to ROI k to thereby stamp an interference pattern of a CGH patch corresponding to ROI k on the CGH plane.

The processor 112 may perform the processing of operations 1606 to 1610, the processing of operations 1611 to 1615, the processing of operations 1616 to 1618, and the processing of operations 1619 to 1621 independently or in parallel.

In operation 1622, the processor 112 merges the stamped interference patterns of the CGH patches to obtain an interference pattern (i.e., a global interference pattern) of a global CGH in the entire area of the CGH plane to thereby generate the CGH.

Figure 17:
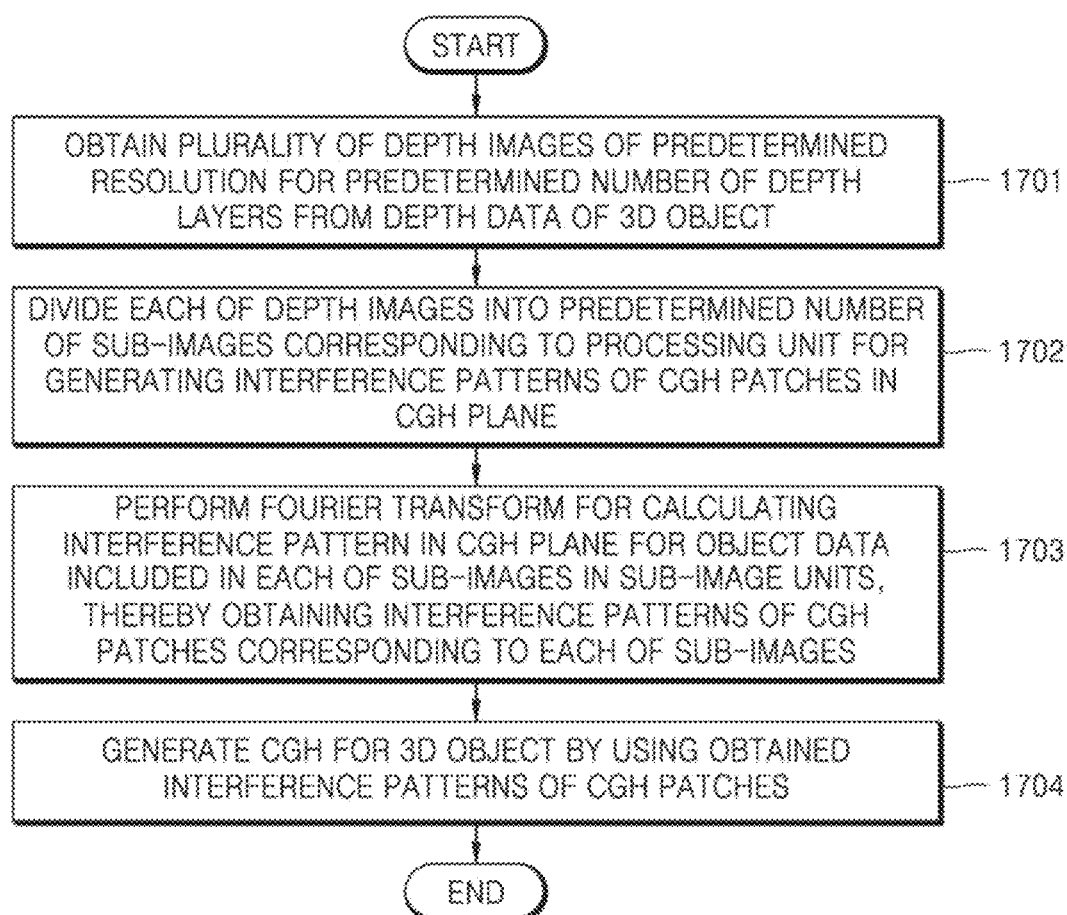
FIG. 17 is a flowchart of a method of processing a 3D holographic image according to an embodiment.

FIG. 17 is a flowchart of a method of processing a 3D holographic image according to an embodiment. Referring to FIG. 17, since the 3D holographic image processing method is related to embodiments described with reference to the above-described drawings, the descriptions given above with reference to the above-described drawings may be applied to the method of FIG. 17, even if omitted below.

In operation 1701, the processor 112 obtains a plurality of depth images of a predetermined resolution for a predetermined number of depth layers from the depth data of the 3D object.

In operation 1702, the processor 112 divides each of the depth images into a predetermined number of sub-images, each sub-image corresponding to a processing unit for generating interference patterns of CGH patches in a CGH plane.

In operation 1703, the processor 112 performs a Fourier transform for calculating an interference pattern in the CGH plane for object data included in each of the sub-images in sub-image units (i.e., individually), thereby obtaining the interference patterns of the CGH patches corresponding to each of the sub-images.

In operation 1704, the processor 112 generates a CGH for the 3D object by using the obtained interference patterns of the CGH patches.

Figure 18:
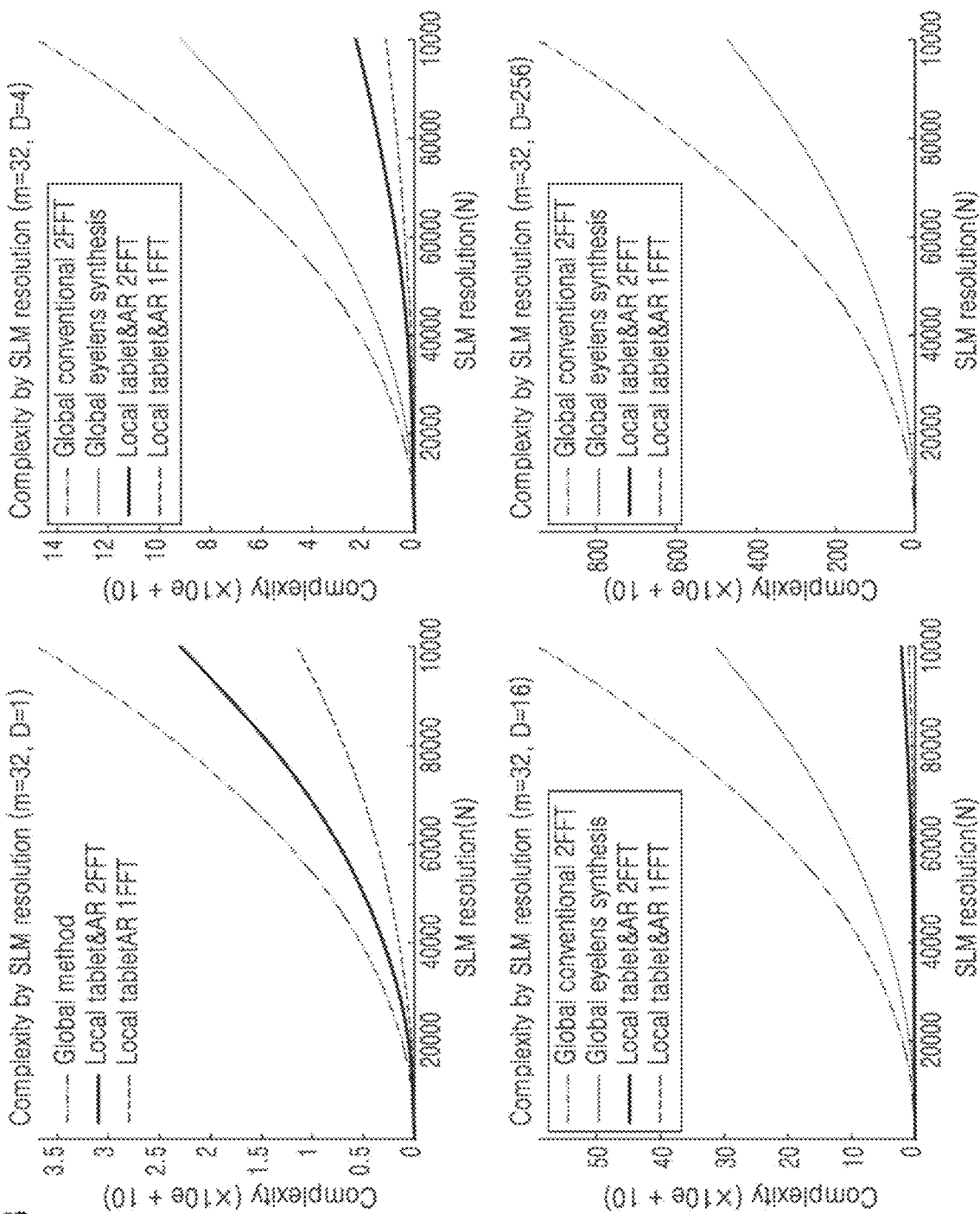
FIG. 18 is a diagram for comparing computational complexity of a case (global method) of using a non-divided depth image and computational complexity of a case (local method) of using a divided depth image, according to an embodiment.

FIG. 18 is a diagram for comparing computational complexity of a case (global method) of using a non-divided depth image and computational complexity of a case (local method) of using a divided depth image, according to an embodiment. FIG. 18 shows graphs obtained by simulating computational complexity of the global method and computational complexity of the local method while increasing image resolution. The graphs show results when the number of depth layers (i.e., a depth level) is set differently. Results when the number of depth layers is 1, 4, 16, and 256 are shown. The greater the number of depth layers and the higher the image resolution, the higher the computational efficiency of the local method. In FIG. 18, 2FFT refers to a double stage Fourier transform and 1FFT refers to a single stage Fourier transform.

Figure 19:
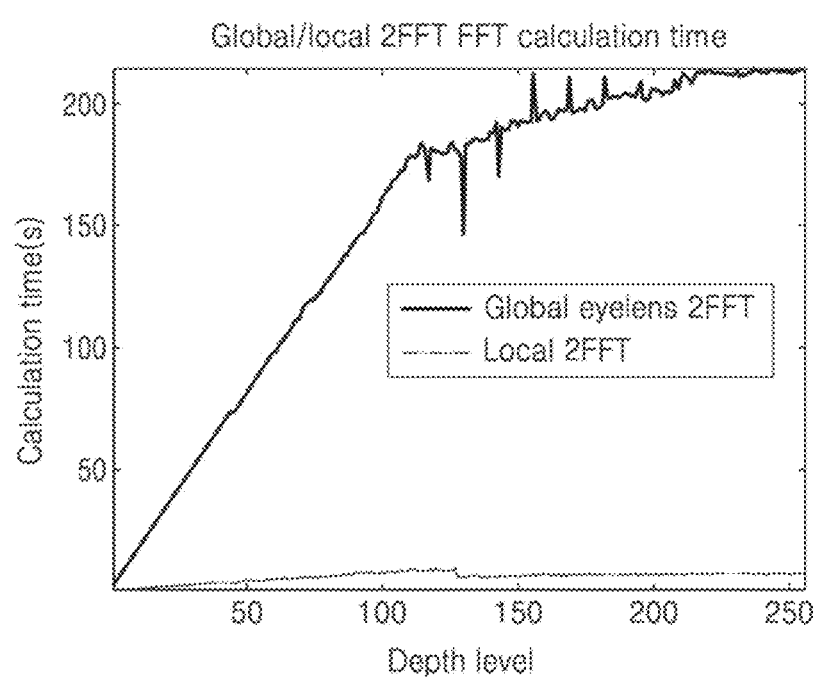
FIG. 19 is a graph showing simulation results of 2FFT calculation times of a global method and a local method according to the number of depth layers, according to an embodiment.

FIG. 19 is a graph showing simulation results of 2FFT calculation times of a global method and a local method according to the number of depth layers, according to an embodiment. Referring to FIG. 19, in the global method, the calculation time increases greatly as the number of depth layers increases, but in the case of the local method, relatively large changes do not occur. In addition, the calculation time of the local method is significantly reduced compared to that of the global method.

Figure 20:
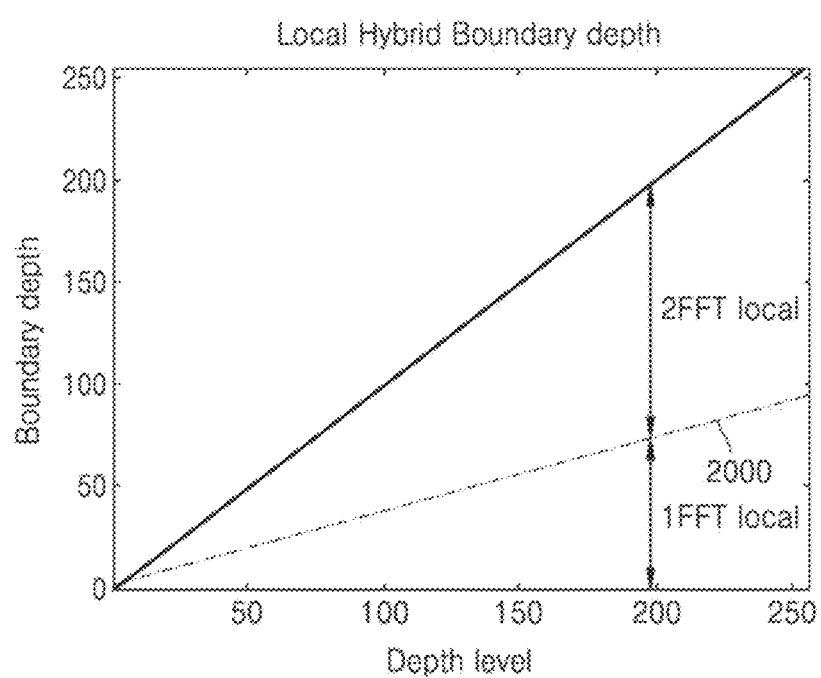
FIG. 20 is a graph showing a result of calculating a threshold depth while changing the number of depth layers, according to an embodiment.

FIG. 20 is a graph showing a result of calculating a threshold depth while changing the number of depth layers, according to an embodiment. Referring to FIG. 20, a line 2000 represents a threshold depth. As shown, the threshold depth depends on the number of depth layers. Based on the line 2000, a depth layer on which a dual stage Fourier transform is to be performed and a depth layer on which a single stage Fourier transform is to be performed may be distinguished from each other.

Figure 21:
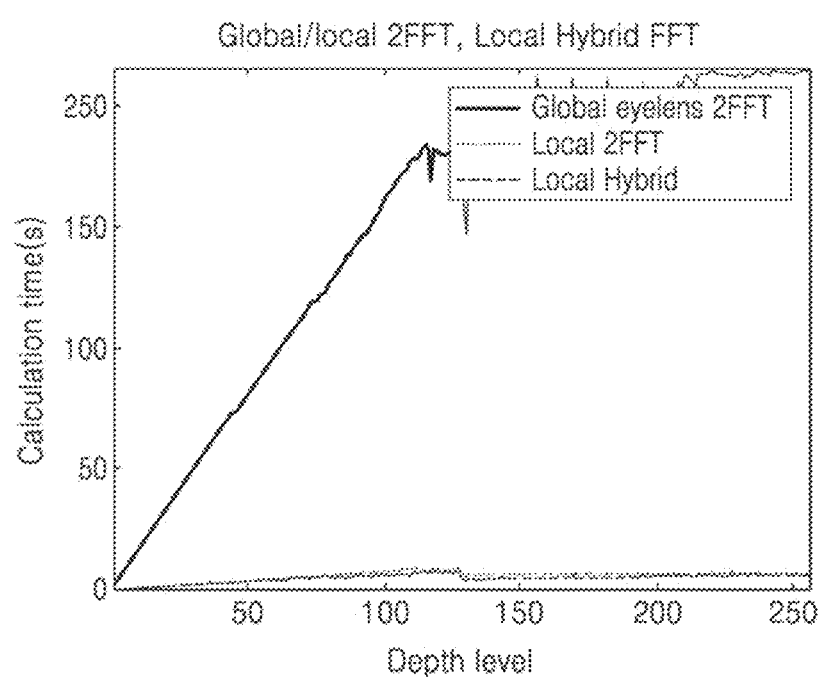
FIG. 21 is a graph for comparing FFT calculation times according to the number of depth layers for various Fourier transform schemes, according to an embodiment.

FIG. 21 is a graph for comparing FFT calculation times according to the number of depth layers for various Fourier transform schemes, according to an embodiment. Referring to FIG. 21, the local method is considerably faster than the global method and a local method ('local Hybrid') performing a hybrid Fourier transform is faster than a local method ('local 2FFT') performing only a double stage Fourier transform. When the number of depth layers is 256 under given conditions, the local method ('local 2FFT') is about 30 times faster than the global method and the local method ('local Hybrid') is about 36 times faster than the global method.

Embodiments described above may be implemented in a general purpose digital computer to be written as a program that may be executed on a computer, and operate the programs using a computer readable recording medium. Also, structure of the data used in embodiments may be recorded on a computer-readable recording medium via various units. Examples of the computer readable recording medium include magnetic storage media (e.g., ROM, floppy disks, hard disks, etc.), optical recording media (e.g., CD-ROMs, or DVDs), etc.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A method of processing a three-dimensional holographic image, the method comprising:
    obtaining a plurality of depth images for a predetermined number of depth layers from depth data of a three-dimensional object, each depth image from among the plurality of depth images having a predetermined resolution and corresponding to a respective depth layer from among the predetermined number of depth layers;
    dividing each depth image from among the plurality of depth images into a predetermined number of sub-images to be processed by respective processing units from among a plurality of processing units;
    obtaining a plurality of interference patterns of a plurality of computer-generated hologram (CGH) patches in a CGH plane, each CGH patch from among the plurality of CGH patches corresponding to at least one respective sub-image from among the predetermined number of sub-images, by performing a Fourier transform on object data included in the respective sub-image to calculate an interference pattern in the CGH plane corresponding to the respective sub-image; and
    generating a CGH of the three-dimensional object using the obtained plurality of interference patterns,
    wherein the obtaining the plurality of interference patterns comprises:
        determining, with respect to each depth image from among the plurality of depth images, a sub-image from among the predetermined number of sub-images in which the object data is present, as a region of interest (ROI); and
        obtaining the plurality of interference patterns by performing the Fourier transform on the determined sub-image and refraining from performing the Fourier transform on remaining sub-images from among the predetermined number of sub-images, and
    wherein the CGH of the three-dimensional object is generated based on the sub-image corresponding to the ROI, without being based on another sub-image from among the predetermined number of sub-images that does not correspond to the ROI.

2. The method of claim 1, wherein each sub-image from among the predetermined number of sub-images has an area of at least two pixels.

3. The method of claim 2, wherein a respective position of each sub-image from among the predetermined number of sub-images in each depth image from among the plurality of depth images corresponds to a respective patch position of each CGH patch from among the plurality of CGH patches in the CGH plane, and wherein a group of interference patterns calculated from a group of sub-images that correspond to a same patch position in each depth image from among the plurality of depth images are mapped to a CGH patch from among the plurality of CGH patches located at the same patch position in the CGH plane.

4. The method of claim 1, wherein the generating the CGH comprises: generating the CGH by merging the obtained plurality of interference patterns to obtain a global interference pattern in an entire area of the CGH plane.

5. The method of claim 1, wherein the sub-image determined as the ROI is determined based on a value of the object data present in the sub-image being greater than a predetermined threshold.

6. The method of claim 1, wherein the obtaining the plurality of interference patterns further comprises:
performing zero padding in a predetermined range on an edge of the sub-image determined as the ROI to form a zero-padded sub-image; and
obtaining the plurality of interference patterns by performing the Fourier transform on the zero-padded sub-image.

7. The method of claim 1, wherein the obtaining the plurality of interference patterns further comprises refraining from performing the Fourier transform on a depth image from among the plurality of depth images that does not include the sub-image determined as the ROI.

8. The method of claim 1, wherein the Fourier transform comprises a double stage Fourier transform comprising a primary Fourier transform that calculates propagation of a light wave from a retina plane of an observer to an eye lens plane of the observer and a secondary Fourier transform that calculates propagation of the light wave from the eye lens plane to the CGH plane.

9. The method of claim 1, wherein the Fourier transform calculates propagation of a light wave from a depth layer from among the predetermined number of depth layers to the CGH plane.

10. The method of claim 9, wherein
the obtaining the plurality of interference patterns comprises:
performing a convolution of a spherical wave on a sub-image from among the predetermined number of sub-images corresponding to an ROI;
performing zero padding in a predetermined range on an edge of the sub-image corresponding to the ROI to form a zero-padded sub-image;
obtaining an interference pattern by performing the Fourier transform on the zero-padded sub-image; and
obtaining the plurality of interference patterns by performing interpolation to match the obtained interference pattern with a sampling grid of a spatial light modulator (SLM).

11. The method of claim 9, wherein the Fourier transform comprises a hybrid Fourier transform comprising:
a single stage Fourier transform on a first depth image from among the plurality of depth images of a first depth layer from among the predetermined number of depth layers having a first depth that is greater than a threshold depth; and
a double stage Fourier transform on a second depth image from among the plurality of depth images of a second depth layer from among the predetermined number of depth layers having a second depth that is less than the threshold depth.

12. A non-transitory computer-readable recording medium having recorded thereon a program for executing the method of claim 1 on a computer.

13. The method of claim 1, wherein the obtaining the plurality of interference patterns further comprises skipping the Fourier transform for the remaining sub-images from among the predetermined number of sub-images that are not determined as the ROI.

14. An apparatus for processing a three-dimensional holographic image, the apparatus comprising:
a memory in which at least one program is stored; and
a processor configured to process the three-dimensional holographic image by executing the at least one program,
wherein the processor is further configured to:
obtain a plurality of depth images for a predetermined number of depth layers from depth data of a three-dimensional object, each depth image from among the plurality of depth images having a predetermined resolution and corresponding to a respective depth layer from among the predetermined number of depth layers,
divide each depth image from among the plurality of depth images into a predetermined number of sub-images to be processed by respective processing units from among a plurality of processing units,
obtain a plurality of interference patterns of a plurality of computer-generated hologram (CGH) patches in a CGH plane, each CGH patch from among the plurality of CGH patches corresponding to at least one respective sub-image from among the predetermined number of sub-images by performing a Fourier transform on object data included in the respective sub-image to calculate an interference pattern in the CGH plane corresponding to the respective sub-image,
generate a CGH of the three-dimensional object using the obtained plurality of interference patterns, and
wherein the processor is further configured to:
determine, with respect to each depth image from among the plurality of depth images, a sub-image from among the predetermined number of sub-images in which the object data is present, as a region of interest (ROI), and
obtain the plurality of interference patterns by performing the Fourier transform on the determined sub-image and refraining from performing the Fourier transform on remaining sub-images from among the predetermined number of sub-images, and
wherein the CGH of the three-dimensional object is generated based on the sub-image corresponding to the ROI, without being based on another sub-image from among the predetermined number of sub-images that does not correspond to the ROI.

15. The apparatus of claim 14, wherein each sub-image from among the predetermined number of sub-images has an area of at least two pixels.

16. The apparatus of claim 15, wherein
a respective position of each sub-image from among the predetermined number of sub-images in each depth image from among the plurality of depth images corresponds to a respective patch position of each CGH patch from among the plurality of CGH patches in the CGH plane, and wherein a group of interference patterns calculated from a group of sub-images that correspond to a same patch position in each depth image from among the plurality of depth images are mapped to a CGH patch from among the plurality of CGH patches located at the same patch position in the CGH plane.

17. The apparatus of claim 14, wherein the processor is further configured to generate the CGH by merging the obtained plurality of interference patterns to obtain a global interference pattern in an entire area of the CGH plane.

18. The apparatus of claim 14, wherein the sub-image determined as the ROI is determined based on a value of the object data present in the sub-image being greater than a predetermined threshold.

19. The apparatus of claim 14, wherein the processor is further configured to:
perform zero padding in a predetermined range on an edge of the sub-image determined as the ROI to form a zero-padded sub-image, and
obtain the plurality of interference patterns by performing the Fourier transform on the zero-padded sub-image.

20. The apparatus of claim 14, wherein the processor is further configured to refrain from performing the Fourier transform on a depth image from among the plurality of depth images that does not include the sub-image determined as the ROI.

21. The apparatus of claim 14, wherein the Fourier transform comprises a double stage Fourier transform comprising a primary Fourier transform that calculates propagation of a light wave from a retina plane of an observer to an eye lens plane of the observer and a secondary Fourier transform that calculates propagation of the light wave from the eye lens plane to the CGH plane.

22. The apparatus of claim 14, wherein the Fourier transform calculates propagation of a light wave from a depth layer from among the predetermined number of depth layers to the CGH plane.

23. The apparatus of claim 22, wherein the processor is further configured to:
perform a convolution of a spherical wave on a sub-image from among the predetermined number of sub-images corresponding to an ROI,
perform zero padding in a predetermined range on an edge of the sub-image corresponding to the ROI to form a zero-padded sub-image,
obtain an interference pattern by performing the Fourier transform on the zero-padded sub-image, and
obtain the plurality of interference patterns by performing interpolation to match the obtained interference pattern with a sampling grid of a spatial light modulator (SLM).

24. The apparatus of claim 22, wherein the Fourier transform comprises a hybrid Fourier transform comprising:
a single stage Fourier transform on a first depth image from among the plurality of depth images of a first depth layer from among the predetermined number of depth layers having a first depth that is greater than a threshold depth; and
a double stage Fourier transform on a second depth image from among the plurality of depth images of a second depth layer from among the predetermined number of depth layers having a second depth that is less than the threshold depth.

* * * * *